(12) United States Patent
Small et al.

(10) Patent No.: US 10,915,724 B2
(45) Date of Patent: Feb. 9, 2021

(54) SYSTEMS AND METHODS FOR IMPROVING IMAGE QUALITY IN SENSORS

(71) Applicant: IDEX BIOMETRICS ASA, Oslo (NO)

(72) Inventors: Jeffrey A Small, Rochester, NY (US); David Joseph Geoffroy, Amherst, MA (US); Alma Delic-Ibukic, Acton, MA (US)

(73) Assignee: IDEX BIOMETRICS ASA, Oslo (NO)

( * ) Notice: Subject to any disclaimer, the term of this patent is extended or adjusted under 35 U.S.C. 154(b) by 158 days.

(21) Appl. No.: 16/108,875

(22) Filed: Aug. 22, 2018

(65) Prior Publication Data

US 2020/0065540 A1    Feb. 27, 2020

(51) Int. Cl.
*G06K 9/00* (2006.01)

(52) U.S. Cl.
CPC .......... *G06K 9/0002* (2013.01); *G06K 9/001* (2013.01); *G06K 9/00114* (2013.01)

(58) Field of Classification Search
CPC .. G06K 9/0002; G06K 9/001; G06K 9/00114; G06K 9/00026; G06K 9/00033; G06K 9/0004
USPC ................................................. 382/125, 124
See application file for complete search history.

(56) References Cited

U.S. PATENT DOCUMENTS

| | | | |
|---|---|---|---|
| 7,078,918 B2 | 7/2006 | Umeda et al. | |
| 7,188,132 B2 | 3/2007 | Nakayama | |
| 7,868,874 B2 | 1/2011 | Reynolds | |
| 8,314,351 B2 | 11/2012 | Reynolds | |
| 8,338,724 B2 | 12/2012 | Reynolds | |
| 8,487,891 B2 | 7/2013 | Oda et al. | |
| 8,558,811 B2 | 10/2013 | Reynolds | |
| 8,592,697 B2 | 11/2013 | Hotelling et al. | |
| 8,593,423 B2 | 11/2013 | Hotelling et al. | |
| 8,682,949 B2 | 3/2014 | Matsushima | |

(Continued)

FOREIGN PATENT DOCUMENTS

| | | |
|---|---|---|
| CN | 102750056 A | 10/2012 |
| CN | 105830345 A | 8/2016 |

(Continued)

OTHER PUBLICATIONS

International Search Report and Written Opinion dated Mar. 4, 2020 issued in International Application No. PCT/IB2019/057087. (20 pages).

(Continued)

*Primary Examiner* — Huy C Ho
(74) *Attorney, Agent, or Firm* — Rothwell, Figg, Ernst & Manbeck, P.C.

(57) ABSTRACT

Systems and methods for detecting a user's finger or other elements may be provided. In some embodiments, the system may include a memory, a sensor area, and a processor. The sensor area may include a set of receiving electrodes which may be partitioned among a plurality of electrode groups. The system may be configured to process signals received by the electrode groups by modulating the signals received from each electrode of the respective electrode group according to a modulation pattern, and demodulating the signals, or values derived therefrom, received from each electrode of the respective electrode group according to a demodulation pattern. The electrode groups may be at least partially interleaved.

20 Claims, 19 Drawing Sheets

(56) References Cited

U.S. PATENT DOCUMENTS

| | | | |
|---|---|---|---|
| 8,729,911 B2 | 5/2014 | Maharyta et al. | |
| 8,730,197 B2 | 5/2014 | Hamaguchi et al. | |
| 8,809,702 B2 | 8/2014 | Reynolds | |
| 8,952,916 B2 | 2/2015 | Reynolds | |
| 8,970,544 B1 | 3/2015 | Mohindra | |
| 8,982,091 B1 | 3/2015 | Mohindra | |
| 9,012,793 B2 | 4/2015 | Reynolds | |
| 9,069,408 B2 | 6/2015 | Hotelling et al. | |
| 9,176,621 B2 | 11/2015 | Lillie et al. | |
| 9,323,398 B2 | 4/2016 | Bernstein et al. | |
| 9,348,477 B2 | 5/2016 | Reynolds | |
| 9,430,097 B2 | 8/2016 | Worfolk | |
| 9,483,141 B2 | 11/2016 | Hotelling et al. | |
| 9,639,733 B2 | 5/2017 | Kremin et al. | |
| 9,696,863 B2 | 7/2017 | Reynolds | |
| 9,710,112 B2 | 7/2017 | Han | |
| 9,715,306 B2 | 7/2017 | Hotelling et al. | |
| 2010/0060591 A1 | 3/2010 | Yousefpor et al. | |
| 2011/0176037 A1 | 7/2011 | Benkley, III | |
| 2012/0268142 A1 | 10/2012 | Kremin et al. | |
| 2016/0140376 A1 | 5/2016 | Kremin et al. | |
| 2016/0148034 A1 | 5/2016 | Kremin et al. | |
| 2016/0306467 A1 | 10/2016 | Reynolds | |
| 2017/0322669 A1 | 11/2017 | Hotelling et al. | |
| 2017/0351897 A1* | 12/2017 | Kremin | G06F 3/044 |
| 2018/0025202 A1 | 1/2018 | Ryshtun et al. | |

FOREIGN PATENT DOCUMENTS

| | | |
|---|---|---|
| JP | H11-99141 A | 4/1999 |
| WO | 2012143752 A2 | 10/2012 |
| WO | 2014021918 A1 | 2/2014 |
| WO | 2016/103215 A1 | 6/2016 |
| WO | 2016085560 A1 | 6/2016 |

OTHER PUBLICATIONS

International Search Report and Written Opinion dated Apr. 17, 2020 issued in International application No. PCT/IB2020/050199. (15 pages).

* cited by examiner

|    |    |    |    |    |    |    |
|----|----|----|----|----|----|----|
| 0  | 1  | 1  | -1 | 1  | -1 | -1 |
| -1 | 0  | 1  | 1  | -1 | 1  | -1 |
| -1 | -1 | 0  | 1  | 1  | -1 | 1  |
| 1  | -1 | -1 | 0  | 1  | 1  | -1 |
| -1 | 1  | -1 | -1 | 0  | 1  | 1  |
| 1  | -1 | 1  | -1 | -1 | 0  | 1  |
| 1  | 1  | -1 | 1  | -1 | -1 | 0  |

Encode matrix

FIG. 4A

|    |    |    |    |    |    |    |
|----|----|----|----|----|----|----|
| 0  | -1 | -1 | 1  | -1 | 1  | 1  |
| 1  | 0  | -1 | -1 | 1  | -1 | 1  |
| 1  | 1  | 0  | -1 | -1 | 1  | -1 |
| -1 | 1  | 1  | 0  | -1 | -1 | 1  |
| 1  | -1 | 1  | 1  | 0  | -1 | -1 |
| -1 | 1  | -1 | 1  | 1  | 0  | -1 |
| -1 | -1 | 1  | -1 | 1  | 1  | 0  |

Decode matrix

SYSTEMS AND METHODS FOR IMPROVING IMAGE QUALITY IN SENSORS

FIELD OF THE DISCLOSURE

This disclosure relates to sensors for the electronic sensing of objects located near or about a sensor, such as a position of a finger or features thereof.

BACKGROUND

Sensors may be used for detecting the presence of objects located near or about a sensor. Such sensors can be configured to sense electrical characteristics of an object in order to sense presence or location of an object near or about the sensor, physical characteristics of the object, shapes, textures on surfaces of an object, material composition, biological information, and other features and characteristics of an object being sensed. For example, a sensor may be configured to detect the presence or position of a user's finger, or in the exemplary case of a fingerprint sensor, one or more features (for example, ridges) of a user's finger.

For some sensors, a portion of the body such as a finger may be positioned near or in contact with the sensor in order to perform a measurement. In some cases, the sensor may apply a carrier signal that may be modulated when a body portion is placed near the sensor. The modulated carrier signal may then be received by the sensor. Because the modulation—rather than the carrier itself—contains the information of interest, it may be beneficial to cancel or compensate for the carrier. This may, for example, allow the dynamic range of the sensor to be better used to detect modulations applied by the body portion, thereby improving the accuracy of the sensor.

Certain challenges may arise, however, where the carrier is canceled or compensated. In particular, there may be a need to restore a common mode portion of the signal when reconstructing a digital image for analysis. Further, electrical coupling between adjacent electrodes can produce blurring in the reconstructed digital image. Accordingly, there is a need for systems and methods to address these and other challenges, as described more fully below.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

In some embodiments, a system for detecting a user's finger or other elements may be provided. The system may include a memory, a sensor area, and a processor. The sensor area may include a set of receiving electrodes, and the set of receiving electrodes may include a plurality of electrode groups. The system may be configured to process signals received by the electrode groups, where the step of processing the signals includes, for each respective electrode group, (a) modulating the signals received from each electrode of the respective electrode group according to a modulation pattern, and (b) demodulating the signals, or values derived therefrom, received from each electrode of the respective electrode group according to a demodulation pattern, thereby determining a set of demodulated values for the respective electrode group. The modulation and demodulation patterns may be selected such that steps (a) and (b) remove a mean value from the signals received by the electrodes of each respective electrode group. The system may be further configured to add a global restore value to the demodulated values. In some embodiments, the restore value may be selected to compensate for the removed mean value. The restore value may be the same for each electrode of the plurality of electrode groups.

In some embodiments, the sensor area may be bounded by a frame. The first electrode group may include a first electrode and a second electrode, the first electrode and the second electrode being arranged in the sensor area such that no electrode of the first electrode group is disposed between the first electrode and the second electrode. In some embodiments, the plurality of electrode groups may be at least partially interleaved, such that one or more electrodes of the set of electrodes are disposed between the first electrode and the second electrode. In some embodiments, a value Y may represent the number of electrodes in the set of receiving electrodes. A value N may represent the number of electrodes in the first electrode group. A value Z may be one greater than the number of electrodes disposed between the first and second electrodes, and Y may be less than or equal to 2NZ. In some embodiments, Z may be less than or equal to 6. In some embodiments N is greater than or equal to 23. In some embodiments, Y may be less than or equal to $1.1NZ$.

In some embodiments, a system for detecting a user's finger or other elements may be provided. The system may include a memory, a sensor area, and a processor. The sensor area may be bounded by a frame and may include a set of receiving electrodes. The set of receiving electrodes may include all of the receiving electrodes of the sensor area. The receiving electrodes of the set may be partitioned among a plurality of electrode groups including at least a first electrode group and a second electrode group. The system may be configured to process signals received by the electrode groups. The step of processing the signals may include, for each respective electrode group, (a) modulating the signals received from each electrode of the respective electrode group according to a modulation pattern, and (b) demodulating the signals, or values derived therefrom, received from each electrode of the respective electrode group according to a demodulation pattern, thereby determining a set of demodulated values for the respective electrode group.

In some embodiments, the first electrode group may include a first electrode and a second electrode, the first electrode and the second electrode may be arranged in the sensor area such that no electrode of the first electrode group is disposed between the first electrode and the second electrode. The plurality of electrode groups may be at least partially interleaved, such that one or more electrodes of the set of electrodes are disposed between the first electrode and the second electrode. A value Y may represents the number of electrodes in the set of receiving electrodes, a value N may represent the number of electrodes in the first electrode group, a value Z may be one greater than the number of electrodes disposed between the first and second electrodes. The values may be selected such that Y is less than or equal to 2NZ. In some embodiments, Z may be less than or equal to 6. In some embodiments, N may be greater than or equal to 23. In some embodiments, Y may be less than or equal to $1.1NZ$.

In some embodiments, a method for detecting a user's finger or other elements may be provided. The method may be performed by a system comprising a memory, a processor, and a sensor area bounded by a frame. The sensor area may include a set of receiving electrodes that includes all of the receiving electrodes of the sensor area. The set of receiving electrodes may include a plurality of electrode groups, the plurality of electrode groups including at least a first electrode group and a second electrode group. The method may include, for each electrode group of the plurality of electrode groups, (a) modulating the signals received from each electrode of the respective electrode group according to a modulation pattern, and (b) demodulating the signals, or values derived therefrom, received from each electrode of the respective electrode group according to a demodulation pattern, thereby determining a set of demodulated values for the respective electrode group.

In some embodiments, the first electrode group may include a first electrode and a second electrode. The first electrode and the second electrode may be arranged in the sensor area such that no electrode of the first electrode group is disposed between the first electrode and the second electrode. The plurality of electrode groups may be at least partially interleaved, such that one or more electrodes of the set of electrodes are disposed between the first electrode and the second electrode. In some embodiments, a value Y may represent the number of electrodes in the set of receiving electrodes. A value N may represent the number of electrodes in the first electrode group. A value Z may be one greater than the number of electrodes disposed between the first and second electrodes. In some embodiments, the values may be selected such that Y is less than or equal to 2NZ. In some embodiments, Z may be less than or equal to 6. In some embodiments, N may be greater than or equal to 23. In some embodiments the values may be selected such that Y is less than or equal to 1.1 NZ. In some embodiments, performing steps (a) and (b) with respect to the first electrode group may result in data being collected for two pixels spaced by at least ninety percent of the length of the row of pixels.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

FIGS. 4A and 4B illustrate exemplary modulation and demodulation patterns.

FIGS. 5A-5C illustrate an exemplary electrode interleaving arrangements.

DETAILED DESCRIPTION

Figure 1:
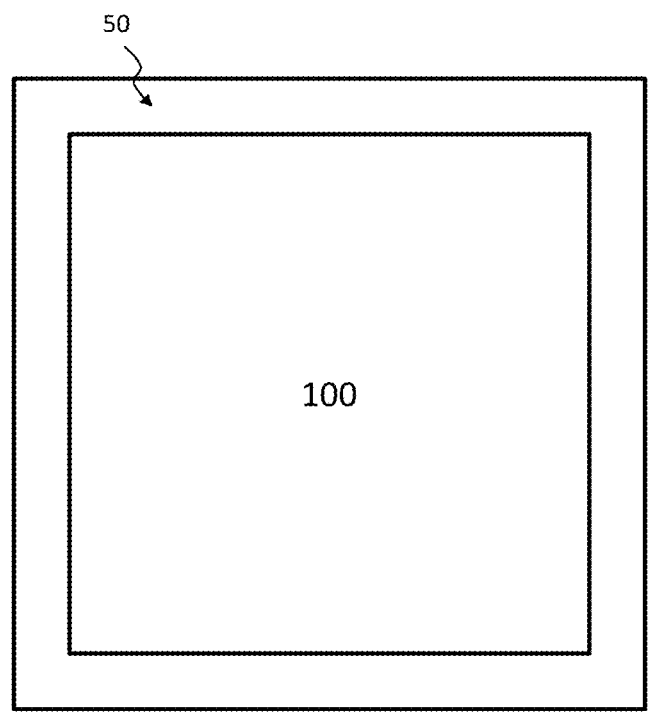
FIG. 1 depicts an exemplary embodiment of a sensor area bounded by a frame.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

As used herein, the term "noise" broadly includes disturbances generated by any of various random processes (e.g., flicker noise, shot noise) and also to interference that is substantially not correlated with the signals being acquired nor with the acquisition method.

As used herein, the term "array" broadly includes structured or unstructured data which may be defined, without limitation, along any number of dimensions.

The present disclosure may be incorporated into any suitable sensor, as will be understood by those of skill in the art. Such exemplary sensors may include touch screens, fingerprint sensors, or other sensors configured to detect the position of an object or feature thereof. For purposes of illustration, and not by way of limitation, the disclosure below discusses embodiments of two-dimensional sensors configured to detect the location of a user's finger or portion thereof. In some embodiments, exemplary sensors may include the general structure described in U.S. Pat. No. 8,421,890, which is incorporated herein by reference in its entirety.

In sensors such as touch screens and fingerprint sensors, noise can interfere with measurement accuracy. It is therefore desirable to minimize noise to the extent possible. For example, in U.S. Pat. No. 9,779,280, which is incorporated by reference herein in its entirety, a system combining reference and compensation electrodes with differential amplifiers is used to improve the rejection of typical conducted and radiated noise sources found in sensors such as fingerprint sensors. Another strategy for minimizing noise is disclosed in U.S. patent application Ser. No. 15/869,214, which is incorporated by reference herein in its entirety. As disclosed in U.S. patent application Ser. No. 15/869,214, signals corresponding to groups of pixels may be modulated and demodulated according to patterns in order to compensate for common mode noise. Disclosed in the present application are techniques for improving data capture rate, signal-to-noise ratio (SNR), and/or signal-to-interference ratio (SIR). The techniques disclosed herein can be combined with the noise compensation strategies discussed in U.S. Pat. No. 9,779,280 and U.S. patent application Ser. No. 15/869,214.

FIG. 1 depicts an exemplary embodiment of a sensor area 100. The sensor area 100 may include a plurality of receive (i.e., RX) electrodes and a plurality of transmit (i.e., TX) electrodes. The sensor area 100 may be generally bounded by a frame 50. The term "frame" should be understood broadly to include any area disposed about the sensor area, whether or not such area defines a separate structure. In some embodiments, the sensor area 100 may be configured to detect the presence of a finger or other object (e.g., a fingerprint ridge). For example, the sensor area 100 may have capacitive touch sensing functionality. Conversely, the frame is less responsive to touch and it may lack touch sensing functionality entirely. For example, the sensor area 100 may include transmit and receive electrodes whereas the frame may lack such electrodes. In some embodiments, a set of receiving electrodes may comprise all of the receiving electrodes within the sensor area. The set may optionally also include one or more receiving electrodes disposed within the frame 50. Such receive electrodes within the frame 50 may optionally be isolated such that they do not respond to the presence of a finger or other object. Disposing one or more electrodes within the frame 50 may be useful in some embodiments, as discussed in more detail below, and such electrodes may be used in combination with other electrodes comprised within the set of electrodes to enhance measurement accuracy.

Figure 2:
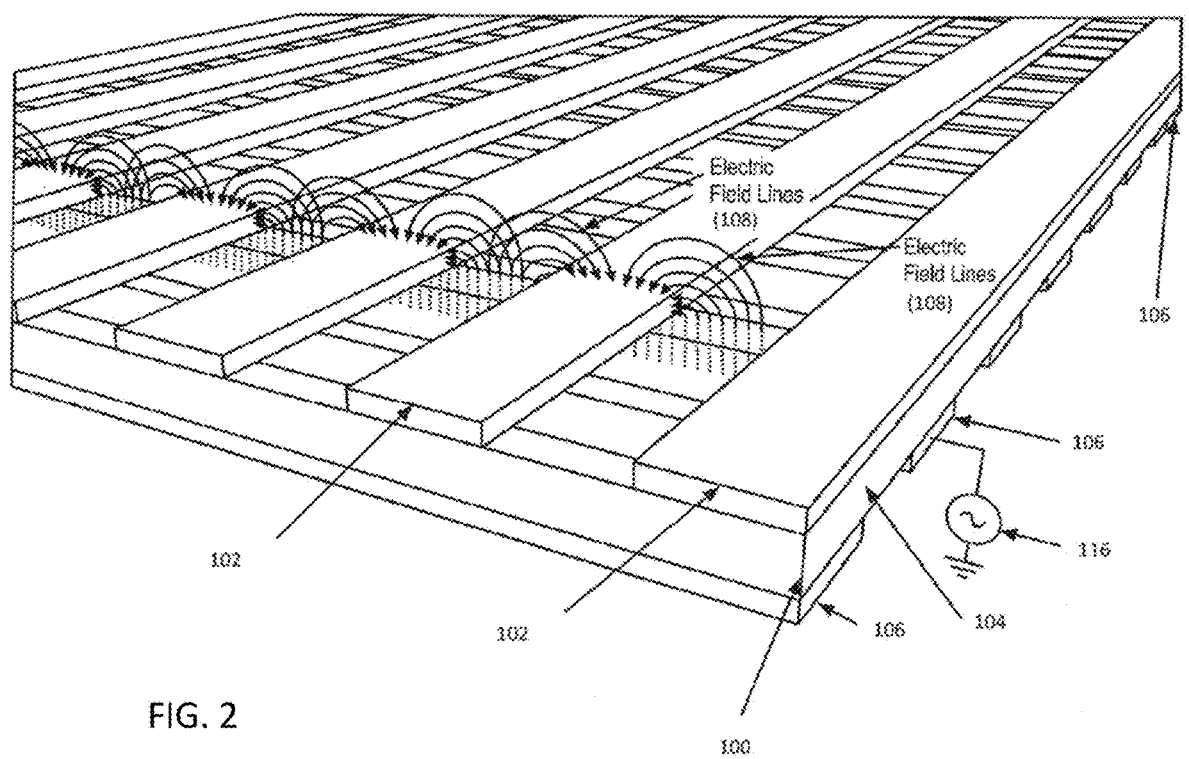
FIG. 2 depicts schematic view of an exemplary sensor grid.

FIG. 2 depicts an exemplary grid of receive electrodes 102 (i.e., RX electrodes) and transmit electrodes 106 (i.e., TX electrodes) disposed along opposing surfaces of an insulating layer 104. Such a grid may be disposed within or partially within the sensor area 100 illustrated in FIG. 1. In some embodiments, the insulating layer may include a dielectric substrate. The transmit electrodes 106 may be arranged to intersect one or more of the receive electrodes 102. In some embodiments, the transmit electrodes 106 may be oriented perpendicularly relative to the receive electrodes. Each of the transmit electrodes 106 may be operatively connected to a power source 116 and configured to apply an electrical signal in an area surrounding the respective transmit electrode 106. For example, the transmit electrodes may be configured to apply an electric field including electric field lines 108 as illustrated in FIG. 2. In some embodiments, the power source 116 may be a battery, capacitor, inductor, generator, or other element capable of applying power.

In some embodiments, one or more (or each) of the receive electrodes 102 may be configured to receive an electrical signal and transmit the received signal into circuitry proximate the respective receive electrode 102. In some embodiments, the receive electrodes 102 may be configured to receive electromagnetic fields applied by the transmit electrodes 106, subject to any modification of the electric field caused by, for example, the presence of an object placed within the range of the electric fields. In this manner, a receive electrode 102 may be configured to receive electrical signals containing an indication as to whether an object or component thereof is within range of the electrical field received by the respective receive electrode 102.

In some embodiments, the transmit electrodes 106 and receive electrodes 102 may be arranged in a grid whereby each intersection (which may also be referred to herein as a pixel) of a respective transmit electrode and receive electrode may function as a transducing circuit configured to output a signal containing an indication as to whether an object is in range of the electric field received by the respective receive electrode. As discussed in greater detail below, the information from each intersection may be collected and processed to determine the location of an object or features thereof across a two-dimensional sensor surface.

Note that other sensor embodiments may be equivalently used and combined with the disclosure herein, and the above description should not be construed as limiting in any way. For example, self- or absolute-capacitance sensors, as well as mutual capacitance, or self-capacitance sensors may be equivalently used with the processing techniques and technical approaches discussed herein.

Exemplary use scenarios for the sensor area 100 are described herein. An object to be sensed (such as a finger, stylus, etc.) may be placed in proximity to the electrodes. The overlap capacitances may vary as a function of their proximity to the object to be sensed. Thus, each overlap capacitance may provide information about the topography of the proximate object being sensed. In this manner, finger or stylus position, or fingerprint details may be determined by measuring the overlap capacitances. The overlap capacitances and thus the received signals may be modulated by the topography of the proximate object. In the case of a fingerprint sensor measuring ridges and valleys of a user's finger print, for example, a typical modulation depth may be in the range of 5%.

The overlap capacitances may be determined by driving one transmit electrode with a transmit signal. This signal may couple through the overlap capacitances to each of the overlapping receive electrodes. Each receive electrode may receive the transmit signal in proportion to that receive electrode's overlap capacitance with the driven transmit electrode. By measuring the strength of each receive electrode's signal, the overlap capacitances along the driven transmit electrode may be determined and used to determine pixel values corresponding to the topography of the object that is proximate to the electrodes. This process may be repeated for each of the transmit electrodes in any desired order, so that a complete 2D set of pixel values corresponding to any of the position, size, orientation, and topography of a proximate object may be determined.

The overlap capacitances may also be determined by simultaneously driving multiple transmit electrodes with according to a predetermined pattern, rather than driving one transmit electrode at a time. For example, suitable activation patterns may include a set of fully or substantially orthogonal signals (e.g., Code-Division Multichannel/CDM). Examples of such signal sets include but are not limited to the rows or columns of a Hadamard matrix, a circulant Legendre sequence matrix, a circulant Barker-code sequence matrix, etc. By using such sets of substantially orthogonal signals, the signal-to-noise and signal-to-interference ratios of the system may be improved.

A CDM code set may be represented by an encoding matrix, where each column of the matrix corresponds to the electrode states during a given timeslot and each row of the matrix corresponds to one of the electrodes. (Alternatively, each column of the matrix may correspond to one of the electrodes and each row of the matrix may correspond to the electrode states during a given timeslot.) Many suitable CDM code sets exist, such as a Hadamard matrix, a truncated Hadamard matrix, a circulant Legendre matrix, or a circulant Barker-code matrix, etc. Suitable patterns and suitable CDM code sets are not limited to these sets; these sets are included as examples.

In some embodiments, activation patterns may be applied to the transmit electrodes. However, driving multiple transmit electrodes simultaneously may exceed the available system power. Power is a particularly important consideration in certain applications for capacitive fingerprint sensors, such as when embedded in contactless smart cards. Contactless smart cards have no on-board battery, but rather must harvest power for the fingerprint sensor from a wireless field. In some cases, the harvested power must be shared with other devices on the card, reducing the amount of power available to drive transmit electrodes on the sensor. Further, in some cases, the sensor may only operate within certain time windows so that the card remains compatible with ISO standards for contactless payments. To save power, yet take advantage of signal to noise improvements that CDM and other exemplary patterns offer, it can be more desirable to apply patterns to the receive electrodes rather than the transmit electrodes. The disclosure herein provides efficient techniques for using multichannel patterns for receive electrodes in an efficient manner, ideal for power-constrained environments such as a capacitive fingerprint sensor embedded in a smart card.

As an example, an Nth-order Legendre sequence 410 contains a single zero, $(N-1)/2$ negative ones and $(N-1)/2$ positive ones (see FIG. 4A). For sake of simplicity, the order of sequences used in the figures in this description is deliberately kept low, however as will be explained later, sequences with higher orders may be preferable in practice. During a first timeslot (for example, corresponding to the first column of FIG. 4A), the $(N-1)/2$ receive electrodes corresponding to the negative ones in the sequence are connected in common to the negative input of a differential amplifier in a receiver circuit, and the $(N-1)/2$ receive electrodes corresponding to the positive ones in the sequence are connected in common to the positive input of the differential amplifier. (See FIGS. 3A and 3B.) During a given timeslot, the differential output of the amplifier may then be proportional to the dot product of the Legendre sequence corresponding to that timeslot with the individual receiver electrodes' received signal values. This value may then be saved as the first element of an N-element vector. During the next timeslot (for example, corresponding to the second column in FIG. 4A), the Legendre sequence may be circularly shifted by one, and the new resulting dot product may be saved as the second element of the N-element vector. The process is repeated for a total of N timeslots, resulting in a received vector containing N elements. An Nth-order decoding matrix 420 (see FIG. 4B) may then be multiplied by this received vector to reconstruct the desired pixel values.

A CDM code set (e.g. a set of truncated Hadamard sequences or a set of circularly-shifted Legendre sequences) where every sequence has a sum of zero may be said to be "balanced." By using a balanced code set, common-mode interference that is connected to the receiver electrodes may be canceled by the differential amplifier. Furthermore, the common-mode portion of the received signals (e.g., the carrier) may also be canceled. This may advantageously permit the full dynamic range of the differential amplifier (and any subsequent circuitry) to be utilized for the modulated portions of the received signals.

Figure 3A:
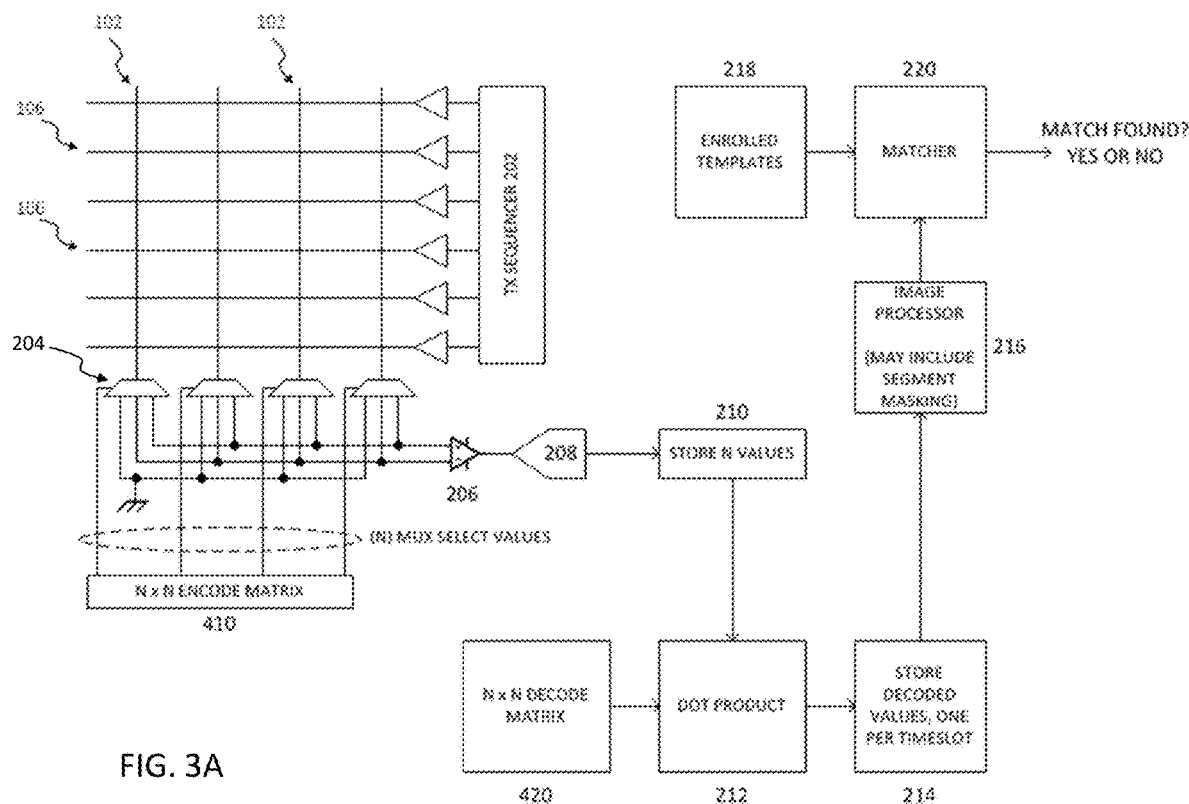
FIGS. 3A-3C illustrate exemplary embodiments for receiving and processing signals.
Figure 3B:
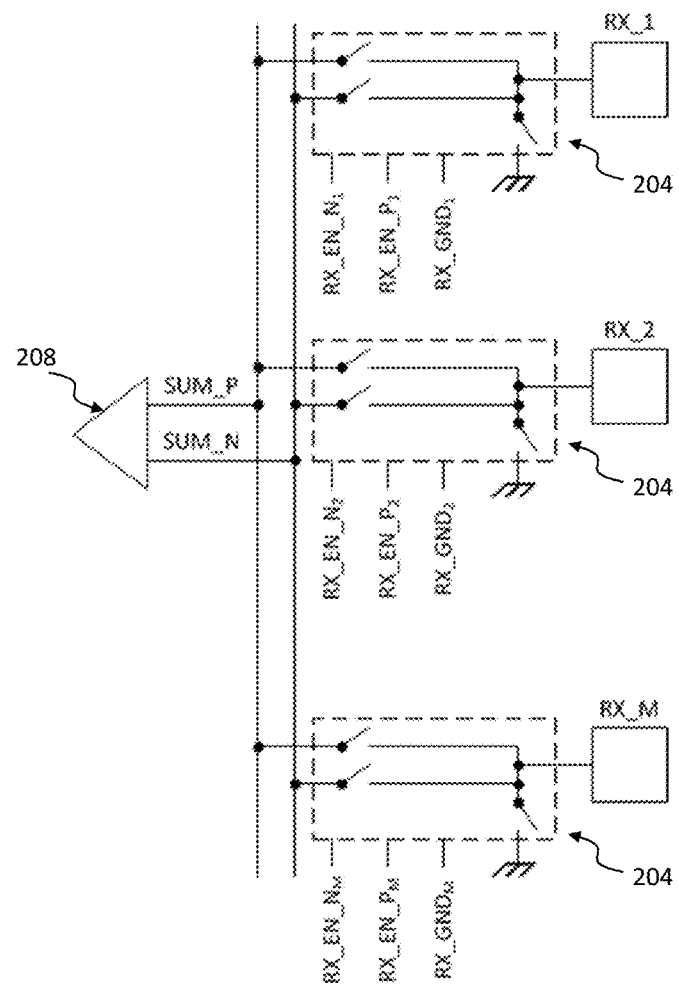
Figure 3C:
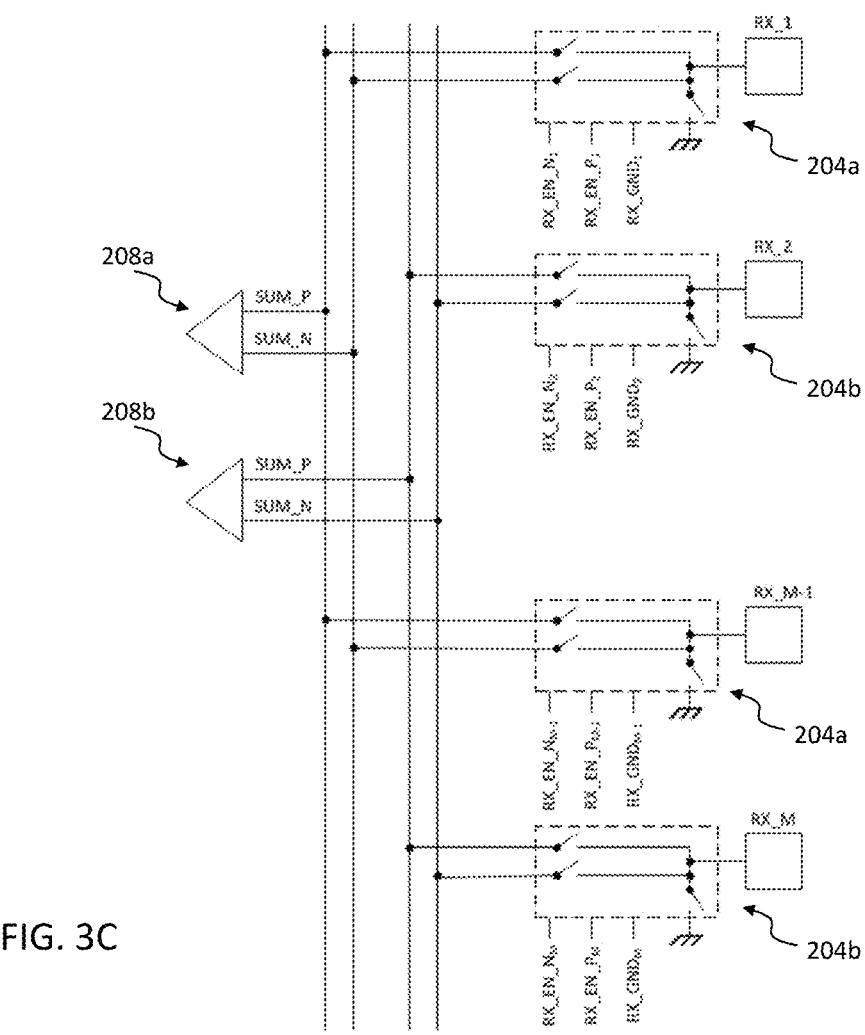

FIGS. 3A-3C illustrate exemplary systems for receiving and processing signals using multichannel patterns. In some embodiments, a plurality of transmit electrodes 106 may be driven by a sequencer 202. A plurality of receive electrodes 102 may receive electrical signals generated by the transmit electrodes 106, along with any modulation signals generated by the presence of objects near an intersection between a respective pair of transmit and receive electrodes. The signal received by a given receive electrode 102 may alternatively be connected to ground, a positive input of a differential receiver 206, a negative input of the differential receiver 206. In some embodiments, an analog front end may include the differential receiver 206 in connection with the sensor electrodes. The selective coupling from a given receive electrode may be effected by a switching unit 204, as described in greater detail with respect to FIG. 3B. In some embodiments, the channel to which a given receive electrode 102 is connected is selected in accordance with a modulation pattern 410. For example, this pattern could be an encode matrix 410 such as that illustrated in FIG. 4A.

The differential output from the receiver 206 may be converted to digital values using, for example, an analog to digital converter 208. The digital output value in a given timeslot may then be proportional to the signals from receiver electrodes during that timeslot as modulated according to parameters specified for that timeslot by the modulation pattern 410. This value may then be saved as the first element of an N-element vector. During the next timeslot, the modulation pattern 410 may specify new parameters by which the received signals may be modulated, and the new output values may be saved as the second element of the N-element vector. The process is repeated for a total of N timeslots, resulting in a received vector containing N elements. A demodulation pattern 420, such as an Nth-order decoding matrix 420 (see FIG. 4B), may then be multiplied (e.g., by calculating a dot product in step 212) by this received vector to reconstruct the desired pixel values. In step 214, the demodulated pixel values may be stored in memory. In step 216, a digital image may be constructed from the demodulated pixel values. This step may optionally include one or more image processing steps, as described in greater detail with reference to FIGS. 9-12. In step 220, the digital image may be compared against one or more enrolled templates 218 using a matching algorithm to determine a biometric parameter. In the case of a fingerprint sensor, for example, the matching algorithm can compare the digital image against template images to determine whether a finger disposed on the fingerprint sensor is likely the same as the finger used to create one or more of the template images. In this case, for example, the biometric parameter could be a user's identity.

FIG. 3B illustrates an exemplary group of switching units 204 connected to an exemplary differential receiver 208. As shown in FIG. 3B, a given receive electrode, such as RX_1, may alternatively be connected (for example, by using switches) to ground, a positive input of the differential receiver (SUM_P), or a negative input of the differential receiver (SUM_N). Each switching unit 204 may be connected to a multiplexing unit which may determine which of the available switches within a given switching unit 204 is connected in a given timeslot. In some embodiments, each of the switching units 204 may be arranged such that received signals from each receive electrode in the sensor area can be selectively connected to any of the positive input terminal of a receiver 208, the negative input terminal of the receiver 208, or ground.

Due to coupling between adjacent receive electrodes, during a timeslot, it is desirable to place at least one grounded electrode in between each receive electrode that is connected to the receiver circuit. This causes the electric fields coupling the transmit electrodes to the receive electrodes to remain more localized, resulting in less blurring of the reconstructed image. To provide the grounded electrodes, multiple groups of receive electrodes may be interleaved. Then, when one such set of electrodes is connected to the receiver circuit, the adjacent interleaved sets of receive electrodes may be connected to ground. Any unused electrodes are also connected to ground. The switch tree in FIG. 3B, which may be controlled by the RX encoder, may enable the receive electrodes to be connected in this manner.

FIG. 3C depicts an embodiment similar to that of FIG. 3B, except that multiple differential receivers (or analog front ends) are provided. One or more groups of electrodes may be connected, via respective switching units 204a, to a first differential receiver 208a. Electrodes belonging to other groups may be connected, via respective switching units 204b, to a second differential receiver 208b. The electrodes connected to a given receiver 208a (or 208b) may belong to a single group or they may belong to multiple groups. Providing multiple differential receivers allows data to be collected from multiple electrode groups simultaneously. For example, during a first time interval, the first differential receiver 208a may receive signals from the electrodes to which it is connected while the second differential receiver 208b receives signals from the electrodes to which it is connected. Although two receivers are shown in this exemplary figure, any number of differential receivers may be used to further improve the rate at which the system collects data.

To reduce electrical coupling between active electrodes, electrodes connected to one differential receiver may be interleaved with those connected to other differential receivers such that electrodes active in a given timeslot will always have at least one grounded electrode between them. For example, electrodes to be activated during a given timeslot may define a superset (typically comprised of multiple groups in a multi-differential receiver embodiment), and the superset may be interleaved with electrodes not within the superset such that for any pair of two electrodes selected from the superset, at least one electrode that is not within the superset is disposed between the selected pair. In a two-receiver embodiment, one way to accomplish this is to assign two electrode groups to each receiver: a first and a second group being assigned to the first receiver, and a third and a fourth group being assigned to the second receiver. The first and third groups may define a first superset that will be active at the same time, and the second and fourth groups may define a second superset that will be active at the same time. In this case, regularly interleaving the electrodes of the groups (first, second, third, fourth, first, and so on) will ensure that no two electrodes of the same superset are adjacent to one-another.

Figure 5A:
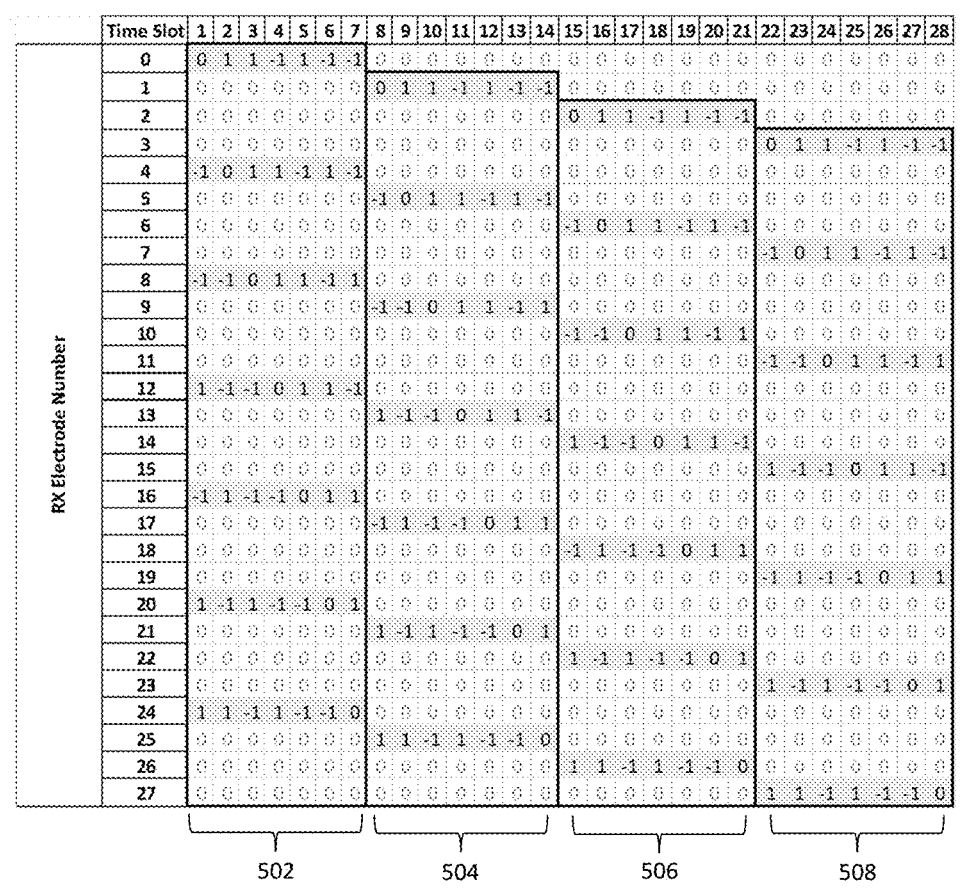
Figure 5B:
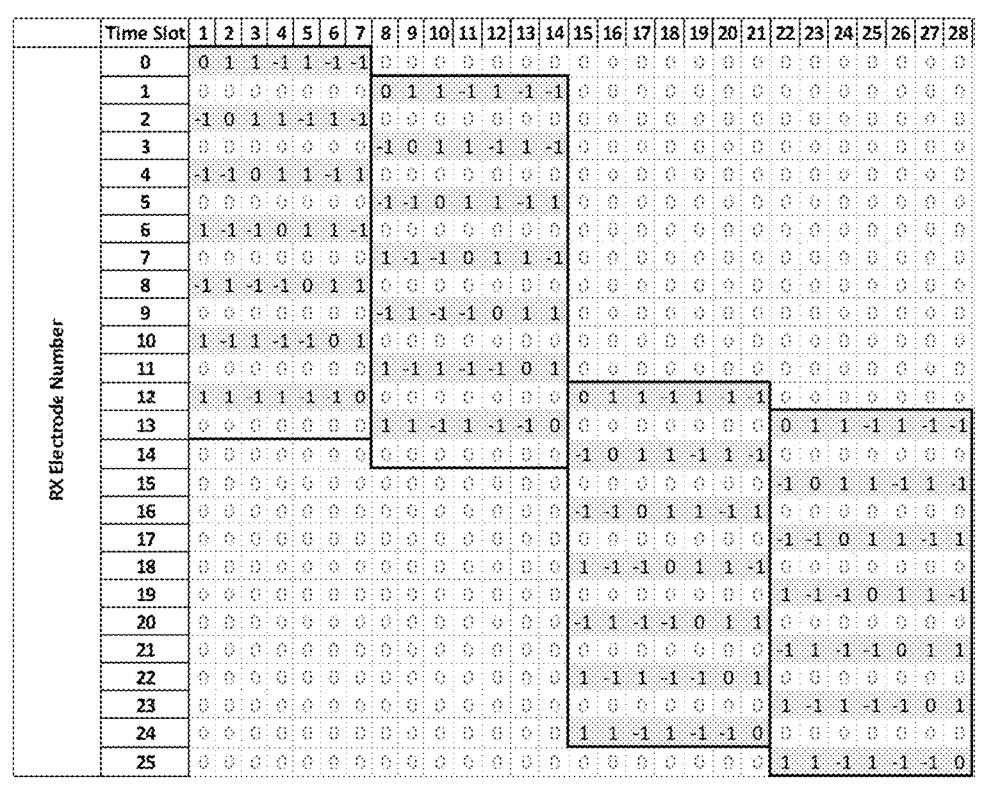
Figure 5C:
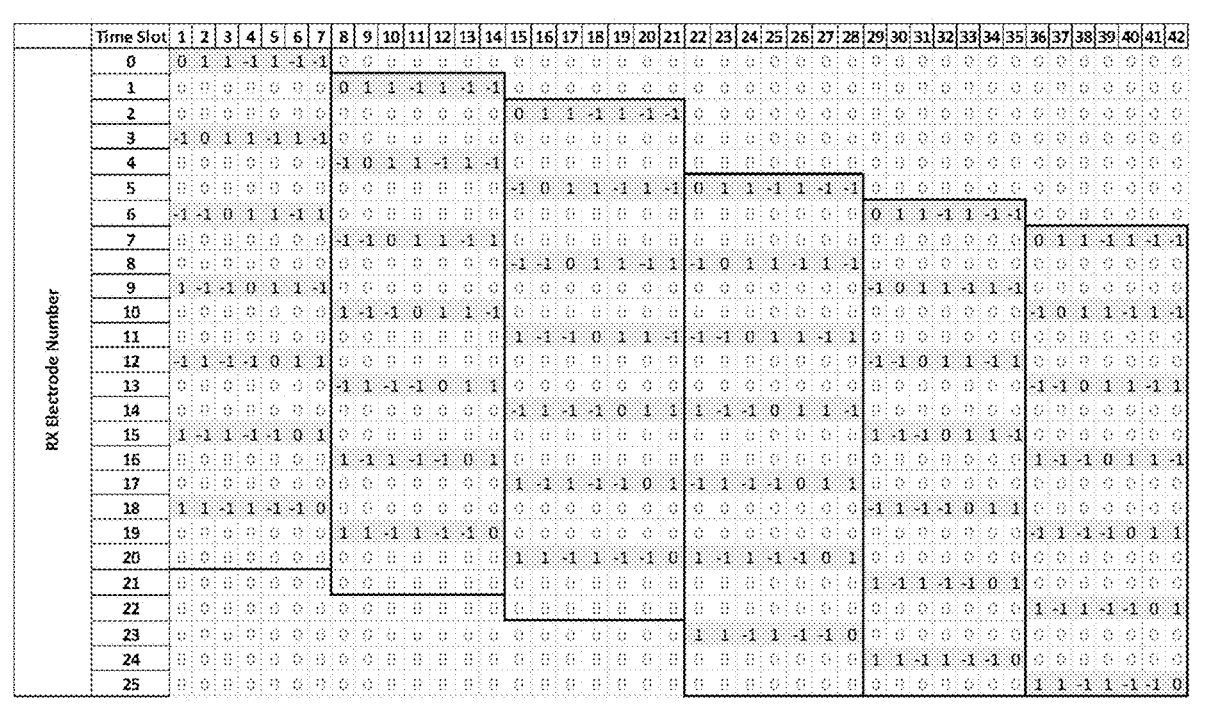

Examples of RX electrode interleaving are illustrated in FIGS. 5A-5C. In the example shown in FIG. 5A, the sensor area includes a set of twenty-eight receive electrodes, which are organized into four electrode groups 502, 504, 506, 508, each electrode group having seven electrodes. Electrode group 502, for example, includes receive electrodes 0, 4, 8, 12, 16, 20, and 24 as labeled in FIG. 5A. Each respective electrode group may be sampled in turn. For example, measurements from electrode group 502 are received in timeslots 1-7, measurements from electrode group 504 are received in timeslots 8-14, and so on. As illustrated in FIG. 5A, the electrodes of the respective electrode groups are interleaved. That is, taking first and second electrodes from group 502 (for example, electrode nos. 8 and 12), where no other electrodes of the same group 502 are between the selected first and second electrodes, it is observed that three electrodes of other groups (here, one electrode from group 504, one electrode from group 506, and one electrode from group 508) are disposed between the first and second electrode. In this example, an interleave factor Z, defined as one plus the number of electrodes between adjacent electrodes of a given group, is equal to four.

In the embodiment of FIG. 5A, the electrode groups are of the same size, and the electrodes are spaced regularly in a repeating pattern of four electrodes, one taken from each electrode group in turn. That is, electrode no. 0 is in group 502, electrode no. 1 is in group 504, electrode no. 2 is in group 506, electrode no. 3 is in group 508, electrode no. 4 is in group 502, and so on. In such an arrangement, selecting any two adjacent electrodes of a single group, at least one electrode of each other group will be disposed between the two selected electrodes. Regular interleaving in this manner is advantageous because it maximizes the distance between electrodes that will be active in a given timeslot, thereby minimizing coupling noise. Moreover, in the embodiment of FIG. 5A, the number of electrodes, Y, in the sensor area is equal to the interleave factor Z multiplied by the number of electrodes per group N. This is advantageous because (i) it stretches each electrode group across the sensor area (e.g., each column in FIG. 5A substantially spans the sensor), and (ii) ensures that all data can be gathered from each receive electrode in the sensor exactly once by iterating through the electrode groups. This reduces noise and improves scan time. Although these conditions (regular interleaving and Y=NZ) are advantageous, it is possible to deviate from these conditions while still achieving the contemplated benefits to a degree. For example, one could interleave irregularly such that electrodes of a common group are spaced by different distances across the sensor. In such cases, Z may be determined by referring to the largest such space between electrodes of a group. Likewise, one could use electrode groups of differing sizes. In such cases, N may be determined by referring to the largest electrode group. Regarding the relationship between Y, N, and Z, particularly advantageous arrangements include those in which $Y \leq 3NZ$, $Y \leq 2NZ$, $Y \leq 1.5NZ$, $Y \leq 1.1NZ$, and $Y \leq NZ$.

Although the interleaving embodiment illustrated FIG. 5A reflects a single-differential receiver embodiment, this concept may be expanded to multi-differential receiver embodiments. For example, groups 502 and 504 may be connected to one differential receiver, and groups 506 and 508 may be connected to another differential receiver. Data may then be collected from groups 502 and 506 simultaneously (e.g., in timeslots 1-7), and data may be collected from groups 504 and 508 simultaneously (e.g., in timeslots 8-14). By interleaving in this manner, no two adjacent electrodes will be active in the same timeslot.

In the example shown in FIG. 5B, the interleave factor Z is two. Here, each receive electrode is separated by one grounded "interleave" electrode. The electrode groups are of size seven. In the first timeslot, fourteen out of the twenty-six available receive electrodes are in use, leaving twelve electrodes unused and hence connected to ground. Note that data is captured from electrode nos. 12 and 13 twice in this embodiment. Although this reduces scanning speed slightly as compared to the embodiment of FIG. 5A, this is still a relatively efficient embodiment, and it may have advantageous relative to the embodiment of FIG. 5A if additional data capture is desired for certain receive electrodes.

In the example shown in FIG. 5C, the interleave factor is three. Here, each receive electrode is separated by two grounded "interleave" electrodes. Furthermore, the electrode groups are of size seven. In the first timeslot, twenty-one out of the twenty-six available receive electrodes are in use, leaving five electrodes unused and hence connected to ground.

Figure 6:
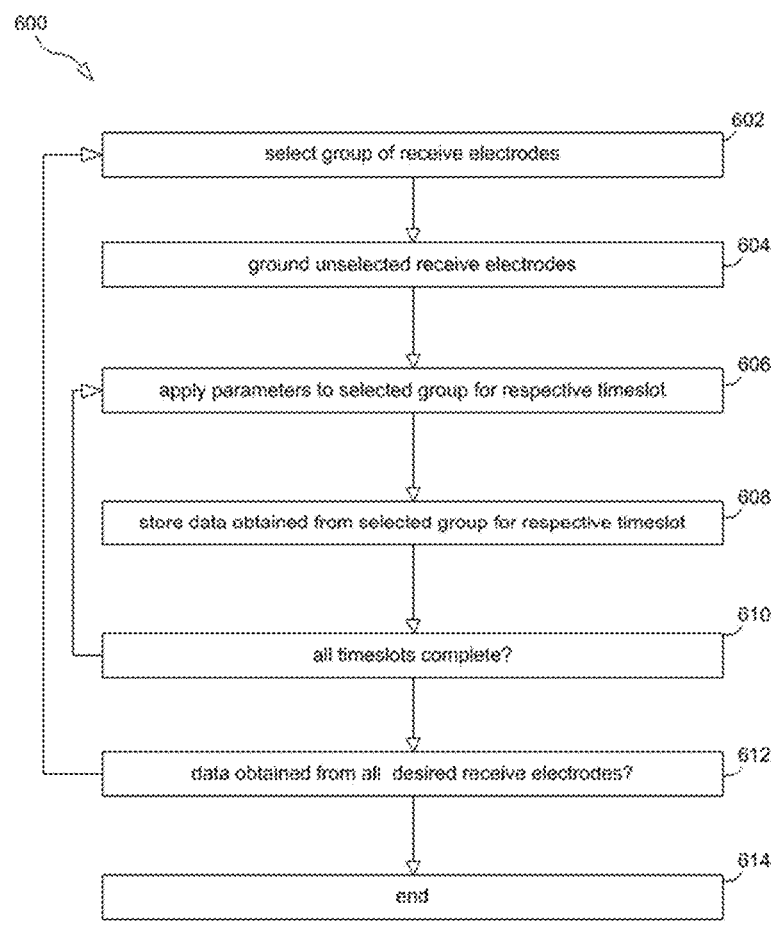
FIG. 6 illustrates an exemplary method for obtaining data from a set of receive electrodes.

FIG. 6 shows an exemplary method 600 for obtaining data from a set of receive electrodes in a sensor. In step 602, a group of receive electrodes may be selected. This may be a group of receive electrodes to which a modulation pattern will be applied, as described above. In step 604, electrodes that are not selected in step 602 may be connected to ground. The unselected electrodes may belong to electrode groups that will be selected for data collection in subsequent cycles. In step 606, parameters specified by a modulation pattern may be applied to the selected group for a first timeslot. For example, the first column of values in the matrix of FIG. 4A may be applied such that electrodes to which the matrix assigns value '0' may be connected to ground, electrodes assigned value '1' may be connected to a positive input of a receiver, and electrodes assigned value '−1' may be connected to a negative input of a receiver. In step 608, data for that timeslot may be stored. In step 610, the system may determine whether the parameters specified for each timeslot in the modulation pattern have been applied. If not, the system may return to step 606, applying the parameters for the next timeslot in the pattern. In step 612, the system may determine whether data has been obtained from all desired receive electrodes. If data has not been collected from all desired electrode, the system may return to step 602 and proceed to collect data from the electrodes of the next group. If data has been collected from all desired electrodes, the system may proceed to step 614 and conclude the data collection process.

As noted above, there are optimal combinations of code order N, number of electrodes Y and interleave Z to keep the time taken to scan all of the RX electrodes to a minimum using the process described above. Ideally, Y is equal to an integer multiple of N multiplied by Z (e.g. as in FIG. 5A). If this is the case, the system may progress through method 600 collecting data from equally-sized electrode groups exactly once without repetition. If this cannot be the case however (e.g. as in FIGS. 3B and 3C), for example due to design constraints on the sensor fixing the number of electrodes to another value, one may overlap previously scanned electrodes again in order to encompass the remainder of the electrodes or use an electrode group of a different size to collect data from the remaining electrodes. For modulation matrices that are short compared to the number of electrodes, the overlap does not cause significant scan-time overhead. However, for matrices that are long compared to the number of electrodes, the overhead in increased scan time can be significant.

As discussed above, there are many different options for suitable patterns that may be used to modulate receive electrodes. One particularly advantageous category of patterns is Legendre sequences. These sequences offer a number of benefits. Legendre sequences are balanced, which allows a larger fraction of the dynamic range to be used for obtaining useful data, thereby improving measurement sensitivity. In a Legendre sequence, each set of parameters for a given timeslot is a circular shift of the parameters for the first timeslot, allowing a large N×N matrix containing Nth-order Legendre sequences to be defined using just N memory storage locations. Legendre sequences are available for any order that is an odd prime number (i.e. any prime number other than one or two). Moreover, except for the polarity (for certain orders) the decoding matrix is identical to the encoding matrix, thus no additional memory storage locations are required for the decoding matrix. Additionally, both the encoding and decoding matrices only contain values from the set $\{-1, 0, +1\}$, thus neither multiplication nor division is required for encoding nor for decoding.

Hadamard sequences have also been found to be particularly advantageous. A Hadamard sequence may be truncated to remove the final column of all ones, resulting in a set of balanced columns. The decoding matrix for a truncated Hadamard encoding matrix is the transpose of the encoding matrix, meaning that the decoding matrix may be efficiently derived. Additionally, for N pixels, only (N−1) timeslots are required, meaning that scan efficiency is improved. Both the encoding and decoding matrices only contain values from the set $\{-1, +1\}$, thus neither multiplication nor division is required for encoding nor for decoding.

As discussed above, decoding may be achieved by multiplying the received vector by an Nth-order decoding matrix (see steps 420 and 212 in FIG. 3A) to reconstruct the desired pixel values. Where balanced codes are used for encoding, the common-mode portion of the received signals is removed, thus the mean value of the demodulated pixel values for a given group will be zero. If a high-order balanced sequence is used (N is large), the mean value of the original pixel values will be approximately constant between electrode groups due to the Law of Large Numbers. Thus, an approximate mean value may be suitably restored by adding a global restore value to every reconstructed pixel of every reconstructed group of N pixels. In some embodiments, this value may be equal, or approximately equal, to the midpoint of the available gray scale range. In other cases, it may be desirable to use a somewhat larger value. For example, for a sensor capable of producing an 8-bit image, the minimum possible gray scale value is 0 (corresponding to black) and the maximum possible gray scale value is 255 (corresponding to white). The midpoint, and hence a suitable corresponding the global restore value for such a gray scale range, is 128.

It is possible, of course, to use non-balanced sequences as well. In such cases, the modulation pattern may remove a portion, but not all, of the common mode portion of the received signals. The term 'remove' should thus be understood broadly to include both complete removal and partial removal of the common mode signal portion. Use of a global restore value is particularly advantageous in cases where the full common mode portion is removed because this ensures that the mean values between electrode groups will be the same. In other cases where some, but not all, of the common mode portion is removed, it may still be acceptable to use a global restore value. In other cases, a global restore value is not used.

Figure 7:
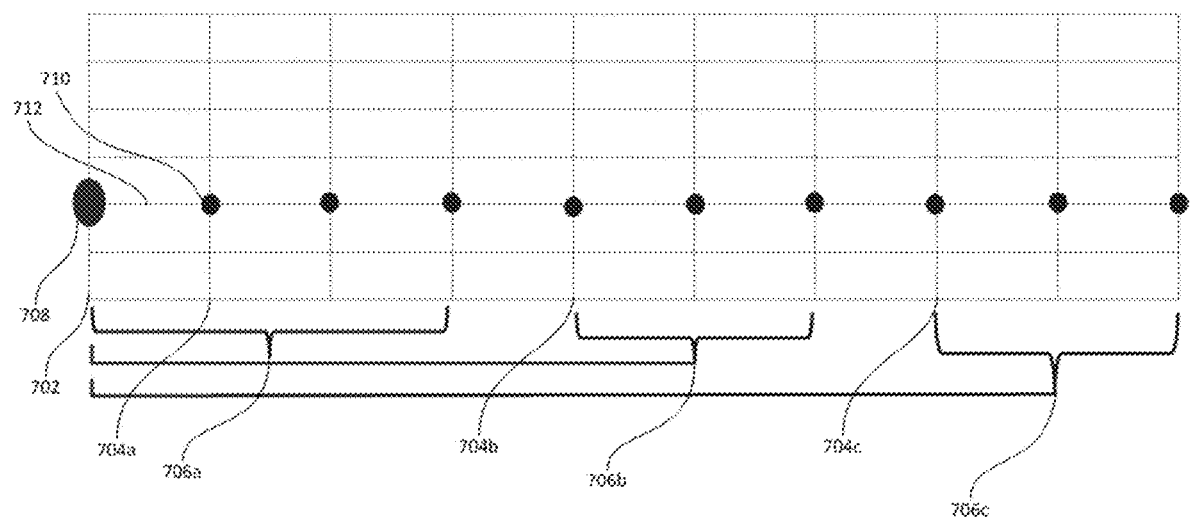
FIG. 7 illustrates an exemplary technique for determining respective restore values for electrode groups.

FIG. 7 shows an exemplary embodiment in which a respective restore value may be determined for each electrode group. In this embodiment, the receive electrodes of the sensor area may be assigned into groups as described above. In FIG. 7, three groups 706a, 706b, and 706c are illustrated. For sake of simplicity, these groups are illustrated in small (N=4) groups without interleaving, but in practice, the groups would preferably be larger and interleaved as described throughout this disclosure. Each of the exemplary receive electrode groups 706a, 706b, and 706c of the sensor area may share a common electrode 702. Each of the electrode groups may also include their own receive electrodes not shared by the other groups. For example, group 706a may include one or more electrodes 704a, group 706b may include one or more electrodes 704b, and group 706c may include one or more electrodes 704c. The receive electrodes may also intersect a plurality of transmit electrodes as described above, forming a plurality of pixels 710. Pixels formed by the common electrode 702 may be considered common pixels 708. For simplicity, FIG. 7 illustrates a single row of pixels disposed along a single transmit electrode 712, though these rows may extend along each of the transmit electrodes in the sensor area. In some embodiments, the common electrode 702 may be placed in a position where it is substantially non-responsive to capacitive modulations generated by the presence of an object (e.g., a finger or fingerprint feature). For example, the common electrode may be disposed within the frame and substantially isolated from a sensor surface. Isolation may help to ensure that true signal values obtained for the common electrode are the same between electrode groups.

In cases where balanced patterns are used to modulate the signals received from each of the electrode groups, the mean of the demodulated values obtained from each group will be zero. The true mean values may differ slightly between groups, however, particularly where lower order patterns are used. Providing a common electrode allows those differences to be determined. Specifically, because the true signal value received for the common electrode 702 may be assumed to be equal between groups (within a given scan cycle), differences in the demodulated values may be assumed to be artifacts introduced by the modulation and demodulation process. These differences may be calculated, and a respective restore value may be determined for each group. The respective restore value for a given group may be one that, when added to the demodulated values obtained for that group, renders the adjusted value obtained for the common electrode as determined for that group equal to the adjusted values obtained for the common electrode as determined for each of the other groups of the sensor. This and other techniques for restoring common mode signals between electrode groups are described in U.S. application Ser. No. 15/869,214, which is incorporated herein in its entirety. The techniques described therein may also be combined with the embodiments presented in this disclosure.

Theory shows that increasing the order of a modulation matrix improves the possible signal to noise ratio. When high-order sets of receive electrodes are also interleaved, the variation in mean values of these sets (before and encoding) is further reduced because the correlation between the sets is high (i.e. the pixel values in each set are similar). Also, interleaving forces each set to more fully span the width (or height) of the sensor, which reduces mean value variations due to local variations in the image content.

However, errors introduced by applying a global restore value will span each row with a pattern that is cyclic and has a period equal to the interleave factor. If the interleave is too large, (a) the period of this pattern might resemble the ridge pitch of a fingerprint and (b) using a larger interleave forces the matrix order to be lower (assuming the number of receive electrodes is constant). Then, the true mean signal values will have more variation from electrode group to electrode group, increasing the amplitude of the restoration error.

Figure 8A:
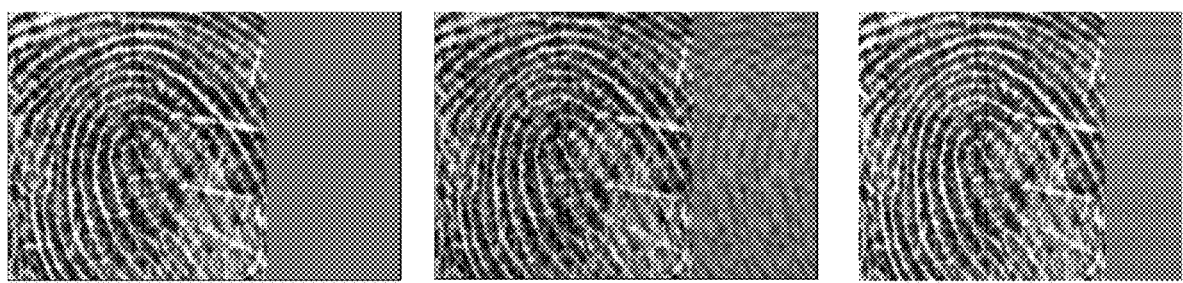
FIGS. 8A-8B illustrate exemplary images containing error patterns visible in non-contact regions.
Figure 8B:
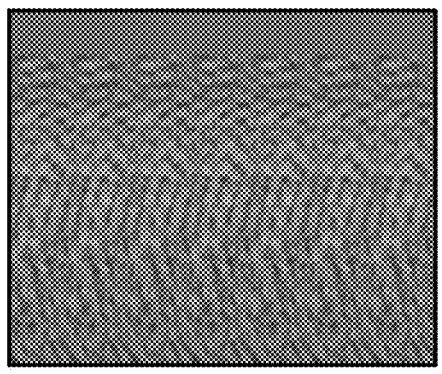
Figure 8B:
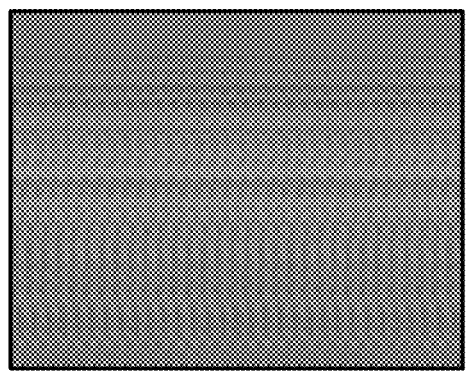

Examples of this are shown in FIGS. 8A-8B. The first (left) image in FIG. 8A is a simulated test image and contains a fingerprint and a blank portion. This test image is simulating a "partial touch" where a finger is only covering part of the sensor, i.e. there is a contact area and a non-contact area. The second (center) image in FIG. 8A shows the results of encoding the test image with a low order pattern (e.g., Legendre order 7) together with a large interleave (28) for 196 receive electrodes then decoding the result and applying a global restore value of 128. Periodic patterns following DC restore are visible in the non-contact portion of the image and it is evident that these patterns could be interpreted as fingerprint ridges by a matching engine, leading to false acceptance or false rejection of a sensed fingerprint compared to an enrolled template. The third (right) image in FIG. 8A, shows the results of encoding with a high order pattern (Legendre order 43) together with a low interleave (4) for 172 RX electrodes then decoding an image and applying a DC restore common value of 128. The theoretical SNR improves with the high order code in the third image compared to the second image. Furthermore, the periodic patterns following DC restore although still present, have shorter periods and lower amplitudes, reducing the likelihood of false acceptance and false rejection rates when this image is sent to a matcher.

The two images in FIG. 8B show the restore errors present in the second and third images of FIG. 8A respectively. Although it is not necessarily noticeable to the human eye observing FIG. 8A, FIG. 8B shows that errors extend across the second and third images in FIG. 8A. That is, the errors may be present in the contact area as well as in the non-contact area. However, since high order Legendre coding improves the SNR, the desired fingerprint signal in the contact area is much stronger than the error.

It has been determined that for a capacitive fingerprint sensor, Legendre orders higher than 23, used in combination with an interleave factor between 2 and 6, give best results, particularly where $Y \leq 3NZ$, $Y \leq 2NZ$, $Y \leq 1.5NZ$, $Y \leq 1.1NZ$, or $Y \leq NZ$.

In a system with regular interleaving, electrode groups of the same size, and in which data is to be collected for each pixel exactly once, Y=NZ is a particularly advantageous condition. In such cases, a larger pattern order will improve maximum SIR. At the same time, the number of receive electrodes to be provided in the sensor area may be bounded within a range due to functional considerations. A larger interleave factor, meanwhile, tends to reduce coupling between active electrodes in a given timeslot. Suitable conditions for a given sensor can be determined with these factors in mind. For example, a Legendre sequence of order 53 may be combined with an interleave factor of 2 to produce a sensor having 106 receive electrodes. In another example, a Legendre sequence of order 43 may be combined with an interleave factor of 3 to produce a sensor having 129 receive electrodes. Other suitable combinations can be determined in this manner, as reflected in the table below.

| LEGENDRE ORDER | MAX SIR IMPROV | INTERLEAVE | | | | |
|---|---|---|---|---|---|---|
| | | 2 | 3 | 4 | 5 | 6 |
| 23 | 10.61 dB | 46 | 69 | 92 | 115 | 138 | Number
| 29 | 11.61 dB | 58 | 87 | 116 | 145 | 174 | of RX
| 31 | 11.90 dB | 62 | 93 | 124 | 155 | 186 | Electrodes
| 37 | 12.67 dB | 74 | 111 | 148 | 185 | 222 |
| 41 | 13.12 dB | 82 | 123 | 164 | 205 | 246 |
| 43 | 13.32 dB | 86 | 129 | 172 | 215 | 258 |
| 47 | 13.71 dB | 94 | 141 | 188 | 235 | 282 |
| 53 | 14.23 dB | 106 | 159 | 212 | 265 | 318 |
| PREFERRED # AFEs | | 1 | 1 | 1, 2 | 1, 2 | 1, 2, 3 |

In a system where data is to be collected for pixels on a common electrode more than once (e.g., data may be collected from the common electrode each time an electrode group is scanned), Y=(N−1)Z+1 is a particularly advantageous condition. For example, a Legendre sequence of order 53 may be combined with an interleave factor of 2 to produce a sensor having 105 receive electrodes. As compared to the 106-electrode embodiment described above, the total number of electrodes is reduced by 1 because the two electrode groups both include the common electrode. In another example, a Legendre sequence of order 43 may be combined with an interleave factor of 3 to produce a sensor having 127 receive electrodes. As compared to the 129-electrode embodiment described above, the total number of electrodes is reduced by 2 because the three electrode groups all include the common electrode. Other exemplary conditions satisfying Y=(N−1)Z+1 are shown in the table below.

| LEGENDRE ORDER | MAX SIR IMPROV | INTERLEAVE | | | | |
|---|---|---|---|---|---|---|
| | | 2 | 3 | 4 | 5 | 6 |
| 23 | 10.61 dB | 45 | 67 | 89 | 111 | 133 | Number
| 29 | 11.61 dB | 57 | 85 | 113 | 141 | 169 | of RX
| 31 | 11.90 dB | 61 | 91 | 121 | 151 | 181 | Electrodes
| 37 | 12.67 dB | 73 | 109 | 145 | 181 | 217 |
| 41 | 13.12 dB | 81 | 121 | 161 | 201 | 241 |
| 43 | 13.32 dB | 85 | 127 | 169 | 211 | 253 |
| 47 | 13.71 dB | 93 | 139 | 185 | 231 | 277 |
| 53 | 14.23 dB | 105 | 157 | 209 | 261 | 313 |
| PREFERRED # AFEs | | 1 | 1 | 1, 2 | 1, 2 | 1, 2, 3 |

In the above tables, the preferred number of AFE's refers to the number of analog front ends (or differential receivers) that may preferably be provided whereby regular interleaving can be used across the sensor such that no two adjacent receive electrodes will be active in the same timeslot. These are considered to be advantageous conditions, but should not be understood as limiting in any manner.

In some embodiments, it may be advantageous to generate a segmentation mask configured to segment portions of an image having useful data from those that do not. For example, in a fingerprint sensor, it may be advantageous to remove a non-contact region from an image so that the image can be more accurately compared against stored template images to authenticate a user's identity.

Figure 9:
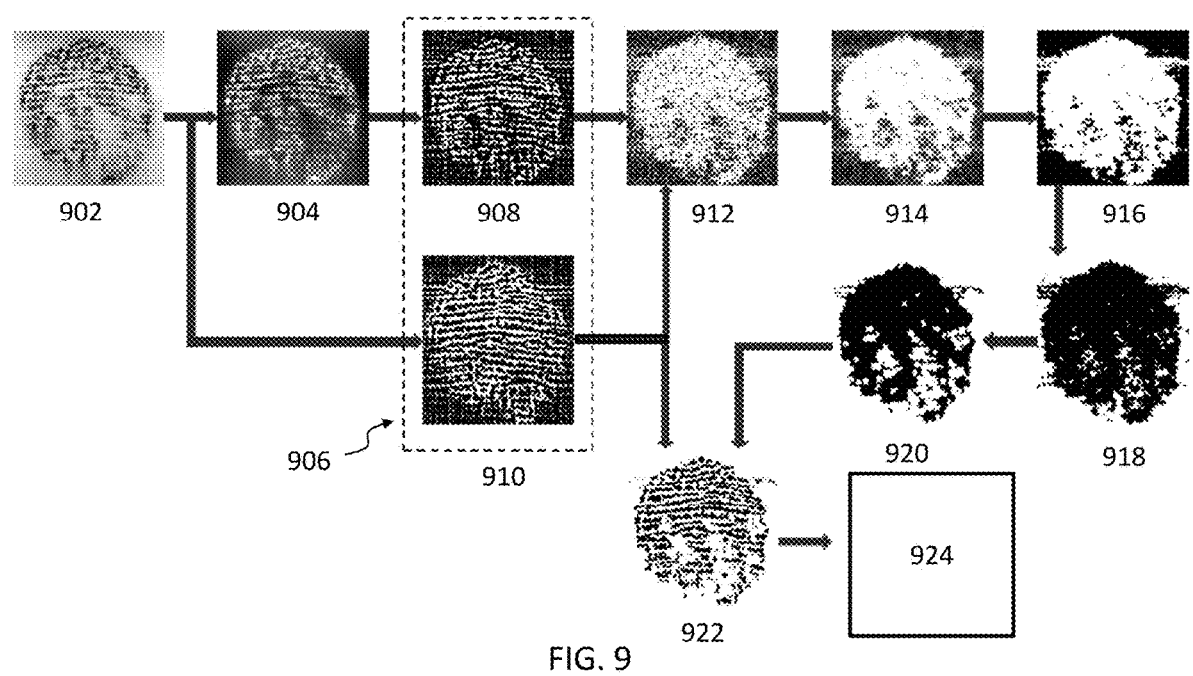
FIG. 9 illustrates an exemplary technique for generating and using a segmentation mask.

FIG. 9 depicts an exemplary technique for generating and using a segmentation mask. These techniques may enhance the suitability of the resulting image for analysis using a matching algorithm, for example, to determine whether a fingerprint matches stored data. Block 902 shows a digital image obtained as described above with reference to FIGS. 1-8. At block 904, the gray scale of the image may be inverted. In block 906, a Laplacian-like filter may be applied to both the original image 902 and the inverted image 904 to produce two filtered images 908 (inverted then filtered) and 910 (filtered). Use of a Laplacian-like filter may aide in determining areas of an image that have high energy, such as within a contact patch. An exemplary Laplacian-like filter is reproduced below.

| −1 | −1 | −1 | −1 | −1 |
|---|---|---|---|---|
| −1 | 0 | 0 | 0 | −1 |
| −1 | 0 | 16 | 0 | −1 |
| −1 | 0 | 0 | 0 | −1 |
| −1 | −1 | −1 | −1 | −1 |

Pixel values from the two Laplacian images 908, 910 may then be added to produce an image 912. Preferably, negative pixel values in the two images 908, 910 are clipped to zero before the images 908, 910 are added to produce image 912. Image 912 may thus represent the magnitude (absolute value) of the Laplacian-filtered image. In block 914, the image 912 may be processed by blurring with a 3×3 boxcar average filter (i.e., a 3×3 unit matrix). At block 916, the blurred image may be thresholded at a value typically equal to the midpoint of the available grayscale. At block 918, the gray scale may be inverted. At block 920, the white regions may be expanded by 1 pixel in each direction. The resulting image 920 may be considered a segmentation mask 920. The segmentation mask 920 may be configured to indicate areas of the original image containing information that may be used to most accurately determine whether a fingerprint captured in the original image matches stored templates. For example, the black regions of the segmentation mask 920 may indicate areas of the original image 902 in which fingerprint features are most clearly resolved.

In block 922, the segmentation mask 920 may be applied to image 910. For example, pixels in image 910 that overlap the black regions in segmentation mask 920 may be kept, and pixels in image 910 that overlap the white regions in segmentation mask 920 may be removed. The image 922 may thus contain the portions of the original image 908 in which fingerprint features are most clearly resolved, and other portions (such as a non-contact region) of the original image 908 may be removed. At block 924, the image 922 may be outputted to a matching algorithm or to other processing techniques to further enhance the image for analysis. Alternatively, the segmentation mask may be applied after the image is analyzed. This may advantageously prevent analysis from creating unwanted edge effects at the boundaries of the segmentation mask. It is noted that the techniques shown in FIG. 9 are merely exemplary, and other techniques for generating and using segmentation masks may be used.

Figure 10A:
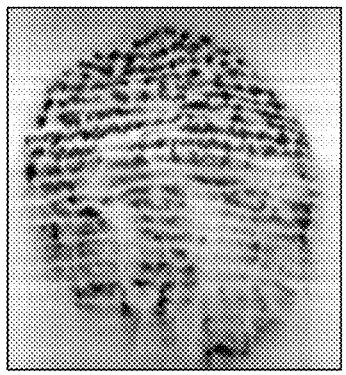
FIGS. 10A-10C show an exemplary technique for isolating areas of interest using a segmentation mask.
Figure 10B:
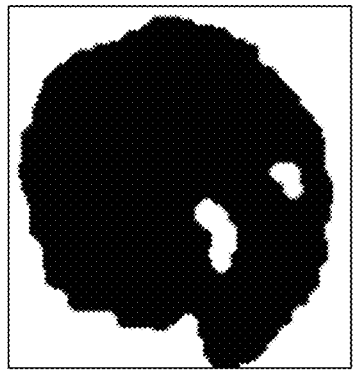
Figure 10C:
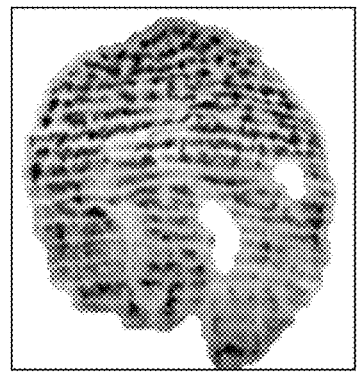

FIGS. 10A-C show an exemplary technique for isolating areas of interest using a segmentation mask. FIG. 10A depicts an exemplary digital image construed using modulation and demodulation techniques described herein. It is observed that periodic error patterns are visible in the image, particularly in non-contact regions. FIG. 10B shows an exemplary segmentation mask created by processing the image shown in FIG. 10A. FIG. 10C shows the result of applying the segmentation mask to the original image. It is observed that the non-contact regions have been removed from the image. Because these non-contact regions—and in particular, the periodic error patterns in the non-contact regions—may be problematic for matching algorithms, removal of these regions from the image may improve matching accuracy. The segmentation mask illustrated in FIG. 10B may optionally be created using the techniques described with reference to FIG. 9.

Figure 11:
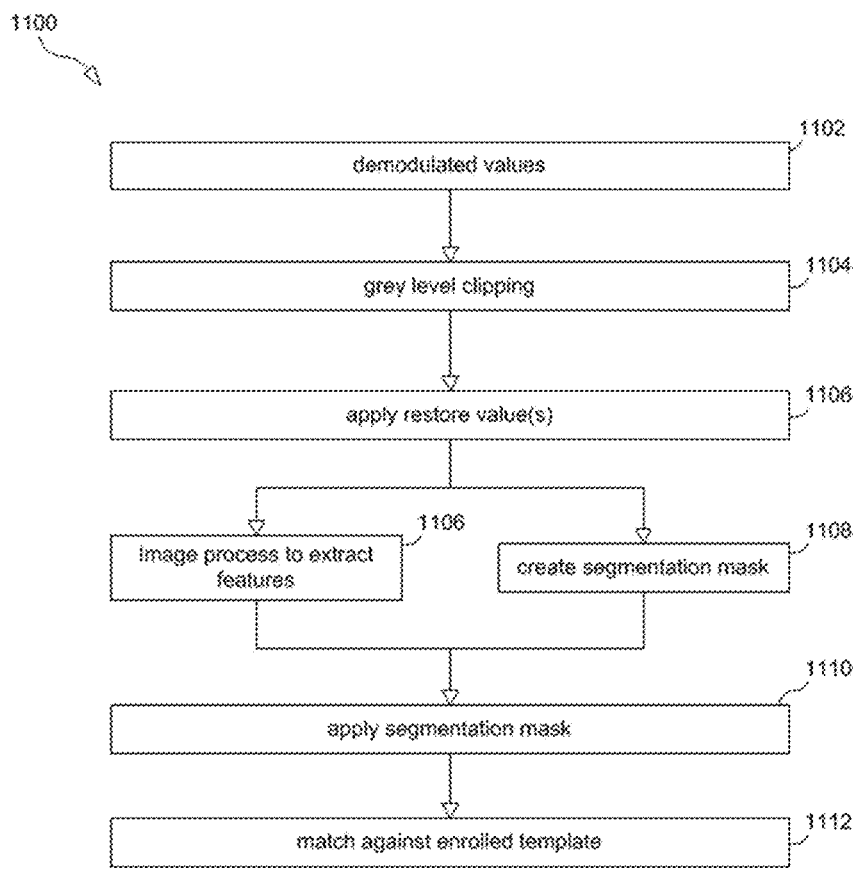
FIG. 11 depicts an exemplary technique in which gray level clipping is used to remove non-contact regions from an image.

FIG. 11 depicts an exemplary method 1100 in which non-contact regions are removed by using gray level clipping, optionally in combination with a segmentation mask. In step 1102, demodulated values are obtained for the pixels of a sensor area. This can be performed according to any of the methods described above. In step 1104, gray level clipping is performed to remove pixels having values above or below a threshold value. Exemplary techniques for performing this step are described in greater detail below. In step 1106, restore values are applied as described above. A global restore value may be used in some embodiments, and respective restore values for each of the electrode groups may be used in other embodiments. In some embodiments, restore values are applied before gray level clipping is performed. In step 1106, image processing techniques may be used to extract features of interest from the image. For example, a Laplacian-like filter may be applied as described above with respect to FIG. 9. In step 1108, a segmentation mask may be created. In step 1110, the segmentation mask may be applied to the image. In step 1112, the resulting image may be matched against an enrolled template using a matching algorithm. Optionally, gray level clipping may be applied without the use of a segmentation mask. In such cases, steps 1106, 1108, and 1110 are omitted.

Figure 12A:
FIGS. 12A-12B show exemplary images in which gray level clipping is used to remove non-contact regions.
Figure 12B:
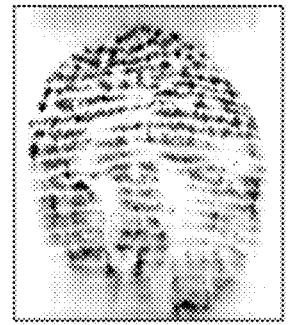

FIGS. 12A and 12B illustrate how gray level clipping may be used to remove non-contact regions from an image. FIG. 12A shows an image constructed from demodulated values as described above, and FIG. 12B shows the same image after gray level clipping has been applied. Methods for applying gray level clipping are described herein. In cases where balanced modulation patterns are used, the pixel values for any given row after modulation and demodulation will average to zero. Further, if a global restore value is used for all pixels, the mean value for each row following application of the global restore value will be equal. Because contact regions generally return lower gray scale values than non-contact regions, it is possible to segment contact regions from non-contact regions by removing from the image pixel values above or below a threshold. Consider, for example, a case where a balanced sequence is used. The mean for each row is zero before a restore value is applied, and contact regions are expected to have lower-than-average pixel values, while non-contact regions are expected to have higher-than-average pixel values. Thus, it may be possible to remove non-contact regions by removing from the image all pixels having a value greater than a threshold equal zero. Alternatively, the threshold can be set somewhat higher or lower than zero to preserve more data or further isolate the regions of interest. For example, the threshold could be set at 0.1, 0.5, 1.0, or 1.5 standard deviations above or below the mean of the pixel values in the image. In embodiments where a global restore value is used, gray scale clipping may alternatively or additionally be used after application of the global restore value. In some embodiments, pixels having values above the global restore value may be removed. In some embodiments, pixels having values above a threshold defined somewhat above or below the global restore value may be removed. For example, in an image in which the available gray scale ranges from 0 to 255, a global restore value of 128 (the midpoint between 0 and 255) may be used, and pixels having values greater than or equal to 150, 170, 190, or 210 may be removed from the image. Note that a grayscale range could be arbitrarily defined, and that the terms 'above' and 'below' are used with reference to an exemplary embodiment where contact regions tend to produce lower pixel values. In an embodiment where the grayscale range is defined differently, the reverse could be true, and pixel values below a threshold could be removed to isolate regions of interest.

An alternative method of gray level clipping is to multiply each image value by the highest possible image value divided by a defined threshold level, then if the resulting image value exceeds the defined threshold, set that image value to the highest possible value. For example, for image values ranging from 0 to 255 and a defined threshold of 191, multiply each image value by 255/191 then if the resulting image value exceeds 255, set that image value equal to 255. Other methods of gray level clipping can also be used.

Selecting an appropriate threshold may improve processing accuracy. In some embodiments, a threshold set to 75% of the maximum gray level works well. For example, for 8-bit grayscale images (range=[0, 255], with a threshold set to 192, all pixels above 192 may be forced to 255, and all remaining pixels (which are in the range [0, 192]) may remapped to fill the range [0, 255]. Such remapping may be done by multiplication, lookup table, or any other suitable method. If the threshold is set too high, less of the unwanted non-contact pixels may be forced to white, which may be undesirable. If the threshold is set too low, however, more of the desired contact pixels may be forced to white, which may also be undesirable. Thus, the selection of the threshold can be important, especially when other mechanisms cause the gray-level range of contact pixels to overlap the gray level range of non-contact pixels. In such cases, the thresholding may advantageously precede the additional image processing steps such as creating and using a segmentation mask to prevent this problem.

Figure 13:
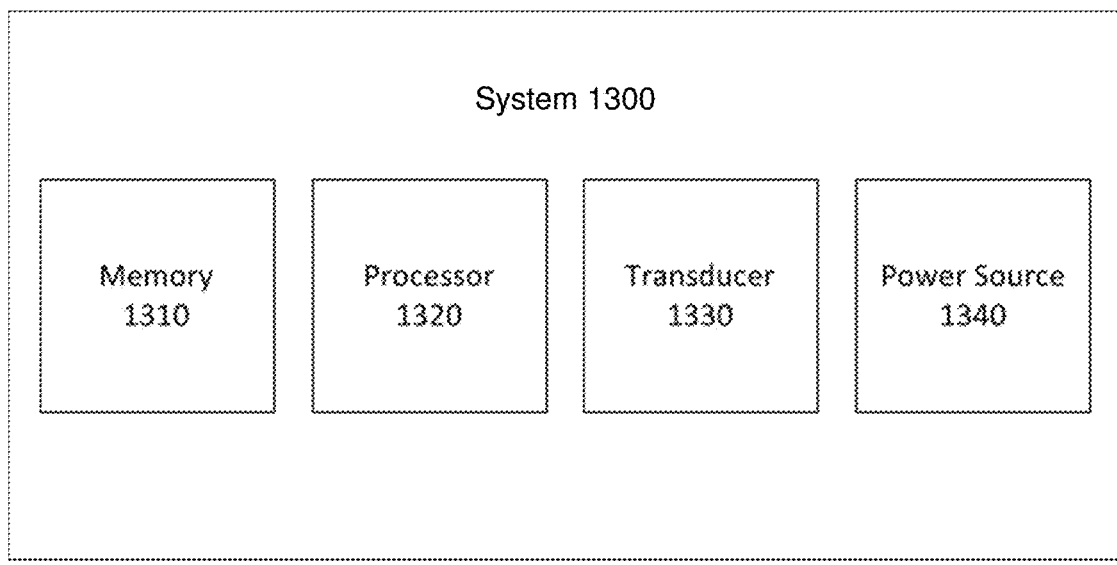
FIG. 13 illustrates a schematic diagram of an exemplary sensor system.

FIG. 13 illustrates a schematic diagram of an exemplary system 1300 for detecting a user's finger or other element. The system 1300 may include a sensor area, memory 1310, a processor 1320, a transducer 1330, and a power source 1340. In some embodiments, the transducer 1330 may be embodied as a two-dimensional grid of receive electrodes and transmit electrodes as described above. In some embodiments, the transducer 1330 may define a sensor area bounded by a frame. In some embodiments, the transducer 1330 may include a plurality of transducing circuits. The memory 1310 may store instructions for or results of any of the processing steps, calculations, and/or determinations described herein. For example, the memory may store one or more parameters from which a modulation and/or demodulation pattern may be derived. The processor 1320 may be configured to perform any of these processing steps, calculations, and/or determinations. In some embodiments, the power source 1340 may be a battery, capacitor, inductor, generator, or other element capable of applying power. For example, the power source 1340 may include an inductor configured to harvest energy from a wireless field. In a smart card, for example, the power source might include a card terminal, and/or a secure element configured to harvest energy.

Figure 14:
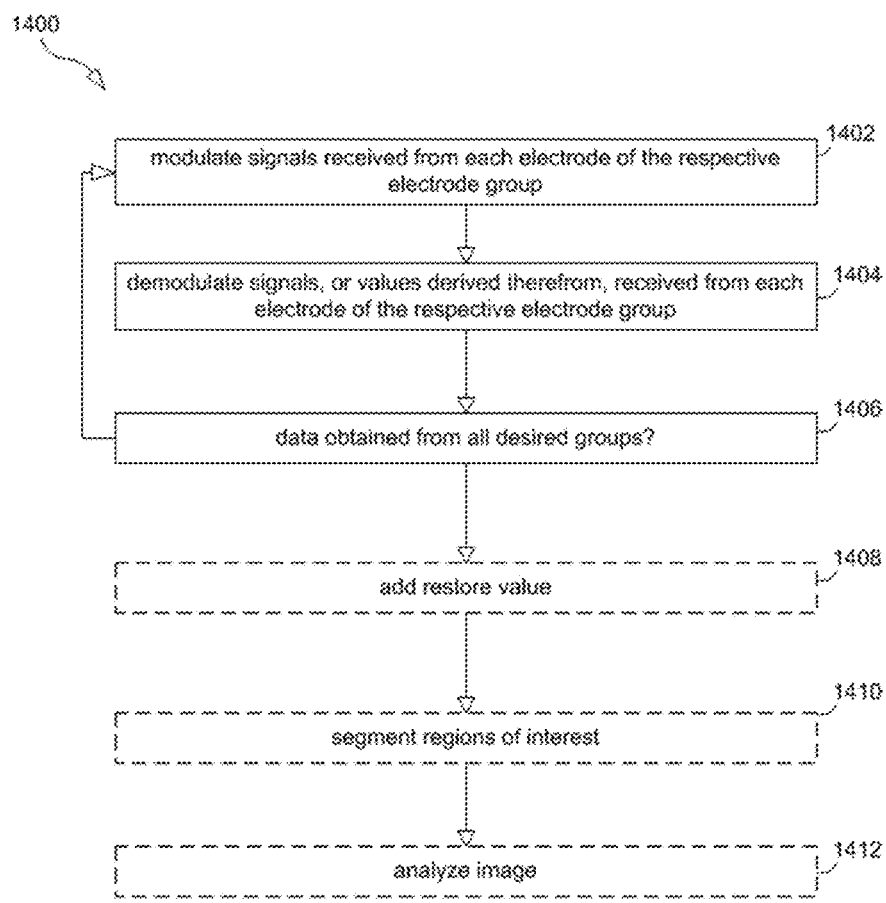
FIG. 14 shows an exemplary method for collecting and analyzing data in a sensor system.

FIG. 14 shows an exemplary method 1400 for detecting a user's finger or other element. The method may be performed by a system such as that described with respect to FIG. 13. For example, method may be performed by a system including a memory, a processor, and a sensor area bounded by a frame. The sensor area may include a set of receiving electrodes, and the set of receiving electrodes may include all of the receiving electrodes of the sensor area. The set of receiving electrodes may partitioned into a plurality of electrode groups, and the plurality of electrode groups may include at least a first electrode group and a second electrode group. In step 1402, the signals received from each electrode of the respective electrode group may be modulated according to a modulation pattern. In step 1404, the signals, or values derived therefrom, received from each electrode of the respective electrode group may be demodulated using a demodulation pattern. In this manner, a set of demodulated values for the respective electrode group may be determined. In step 1406, the system determines whether data has been obtained from all desired electrode groups. If not, the process may return to step 1402 to collect data from the next electrode group. If data has been collected from all desired groups, the data collection process may be completed for that line of the sensor. The modulation and demodulation patterns may be the same for each group, or they may be different. Optionally, the modulation and/or demodulation patterns may be derived from a modulation parameter stored in the memory.

In some embodiments, the first electrode group may include a first electrode and a second electrode, and the first electrode and the second electrode being arranged in the sensor area such that no electrode of the first electrode group is disposed between the first electrode and the second electrode. The plurality of electrode groups may be at least partially interleaved, such that one or more electrodes of the set of electrodes are disposed between the first electrode and the second electrode. As described above, a value Y may represent the number of electrodes in the set of receiving electrodes, a value N may represent the number of electrodes in the first electrode group, and a value Z may be one greater than the number of electrodes disposed between the first and second electrodes. The system may be arranged such that Y≤2NZ. The system may alternatively be arranged such that any of the other preferred conditions described above are satisfied. In some embodiments, the plurality of electrode groups may form a row of pixels defined along a transmit electrode (see, e.g., FIGS. 2, 3A, and 7). Performing steps 1402 and 1404 may result in data being collected for two pixels spaced by at least one third, one half, or ninety percent of the length of the row of pixels. In determining the spacing between the two pixels, the terms 'one third,' 'one half,' and 'ninety percent' are meant to be inclusive of the end-points. For example, pixel numbers 1 and 50 of a 100-pixel row are considered to be spaced by at least one half of the length of the row.

In some embodiments, the modulation and demodulation patterns may be selected such that steps 1402 and 1404 remove a mean value from the signals received by the electrodes of each respective electrode group. In optional step 1408, a restore value may be added to compensate for the removed mean value. In some embodiments, the restore value may be a global restore value that is the same for each electrode of the plurality of electrode groups. In other embodiments, a respective restore value may be applied to each electrode group. For example, respective restore values may be determined by use of a common electrode, as described above with respect to FIG. 7.

In optional step 1410, regions of interest of an image constructed from the data collected in steps 1402-1406 may be segmented from other areas of the image. For example, contact regions may be isolated from non-contact regions as described above. In some embodiments, this may be performed by determining a segmentation mask based on the signals received from the plurality of electrode groups, and constructing a digital image based on the signals received from the plurality of electrode groups and the segmentation mask. In some embodiments, this may be performed as described with respect to FIG. 9. In optional step 1412, a biometric parameter may be determined by analyzing the digital image. In embodiments where a segmentation mask is used, use of the segmentation mask to construct the digital image may facilitate the determination of the biometric parameter by removing from the digital image an image portion that would otherwise be characterized by an error pattern having a spatial period substantially equal to an average distance between adjacent receiving electrodes in the sensor area multiplied by Z.

In some embodiments, data capture performed via steps 1402-1406 may be accelerated by using multiple differential receivers. For example, the system may include at least a first differential receiver and a second differential receiver, the first differential receiver may be arranged to receive signals from electrodes of a first electrode group, and the second differential receiver may be arranged to receive signals from electrodes of a second electrode group. In a first interval, the first differential receiver may receive signals from the electrodes of the first electrode group during a first time interval while and the second differential receiver receives signals from the electrodes of the second electrode group. In some embodiments, the electrodes of first and second electrode groups together define a superset, and the superset of electrodes may be interleaved with electrodes not within the superset such that for any pair of two electrodes selected from the superset, at least one electrode that is not within the superset is disposed between the selected pair.

Exemplary Embodiments

Embodiment 1. A system for detecting a user's finger or other elements, the system comprising:

a memory;

a sensor area, wherein the sensor area comprises a set of receiving electrodes, the set of receiving electrodes comprising all of the receiving electrodes of the sensor area, the set of receiving electrodes comprising a plurality of electrode groups, the plurality of electrode groups comprising at least a first electrode group;

a processor, wherein the system is configured to:

process signals received by the electrode groups, wherein the step of processing the signals comprises, for each respective electrode group:

(a) modulating the signals received from each electrode of the respective electrode group according to a modulation pattern; and (b) demodulating the signals, or values derived therefrom, received from each electrode of the respective electrode group according to a demodulation pattern, thereby determining a set of demodulated values for the respective electrode group;

wherein the modulation and demodulation patterns are selected such that steps (a) and (b) remove a mean value from the signals received by the electrodes of each respective electrode group;

the system being further configured to add a global restore value to the demodulated values, the restore value being selected to compensate for the removed mean value, the restore value being the same for each electrode of the plurality of electrode groups.

Embodiment 2. The system of embodiment 1, wherein the sensor area is bounded by a frame, the first electrode group comprises a first electrode and a second electrode, the first electrode and the second electrode being arranged in the sensor area such that no electrode of the first electrode group is disposed between the first electrode and the second electrode;

wherein the plurality of electrode groups are at least partially interleaved, such that one or more electrodes of the set of electrodes are disposed between the first electrode and the second electrode;

wherein a value Y represents the number of electrodes in the set of receiving electrodes, a value N represents the number of electrodes in the first electrode group, a value Z is one greater than the number of electrodes disposed between the first and second electrodes, and $Y \leq 2NZ$.

Embodiment 3. The system of embodiment 2, wherein:

all of the electrodes of the set of electrodes are comprised within one or more of the plurality of electrode groups;

at least one electrode of at least one of each electrode group, other than the first electrode group, of the plurality of electrode groups is disposed between the first electrode and the second electrode.

Embodiment 4. The system of any of embodiments 2 and 3, wherein Z is less than or equal to 6, N is greater than or equal to 23, and $Y \leq 1.1 \times NZ$.

Embodiment 5. The system of any of embodiments 2-4, wherein the modulation pattern used for each electrode group is the same.

Embodiment 6. The system of any of embodiments 1-5, wherein the system is further configured to:

determine a segmentation mask based on the signals received from the plurality of electrode groups;

construct a digital image based on the signals received from the plurality of electrode groups and the segmentation mask; and determine a biometric parameter based on the digital image, wherein use of the segmentation mask to construct the digital image facilitates the determination of the biometric parameter by removing from the digital image an image portion that would otherwise be characterized by a periodic error pattern.

Embodiment 7. The system of any of embodiments 1-6, wherein the system further comprises at least a first differential receiver and a second differential receiver, and the plurality of electrode groups comprises a second electrode group;

the first differential receiver being arranged to receive signals from the electrodes of the first electrode group;

the second differential receiver being arranged to receive signals from the electrodes of the second electrode group;

wherein the system is arranged such that during a first time interval, the first differential receiver receives signals from the electrodes of the first electrode group while the second differential receiver receives signals from the electrodes of the second electrode group; and the electrodes of first and second electrode groups together defining a superset, the superset of electrodes being interleaved with electrodes not within the superset such that for any pair of two electrodes selected from the superset, at least one electrode that is not within the superset is disposed between the selected pair.

Embodiment 8. The system of any of embodiments 1-7, wherein a modulation parameter is stored in the memory, the modulation pattern is a matrix and comprises a plurality of vectors arranged along a common dimension of the matrix, each vector of the plurality of vectors being derived from the modulation parameter.

Embodiment 9. The system of embodiment 8, wherein the demodulation pattern is derived from the modulation parameter.

Embodiment 10. The system of any of embodiments 1-9, wherein the common restore value is approximately equal to a midpoint of a grayscale range used to construct a digital image based on the signals received from the plurality of electrode groups.

Embodiment 11. A method for detecting a user's finger or other elements, the method being performed by a system comprising a memory, a processor, and a sensor area, wherein the sensor area comprises a set of receiving electrodes, the set of receiving electrodes comprising all of the receiving electrodes of the sensor area, the set of receiving electrodes comprising a plurality of electrode groups, the plurality of electrode groups comprising at least a first electrode group, the method comprising:

for each respective electrode group in the plurality of electrode groups:

(a) modulating the signals received from each electrode of the respective electrode group according to a modulation pattern; and (b) demodulating the signals, or values derived therefrom, received from each electrode of the respective electrode group according to a demodulation pattern, thereby determining a set of demodulated values for the respective electrode group;

wherein the modulation and demodulation patterns are selected such that steps (a) and (b) remove a mean value from the signals received by the electrodes of each respective electrode group; and adding a global restore value to the demodulated values, the restore value being selected to compensate for the removed mean value, the restore value being the same for each electrode of the plurality of electrode groups.

Embodiment 12. The method of embodiment 11, wherein the sensor area is bounded by a frame, the first electrode group comprises a first electrode and a second electrode, the first electrode and the second electrode being arranged in the sensor area such that no electrode of the first electrode group is disposed between the first electrode and the second electrode;

the plurality of electrode groups are at least partially interleaved, such that one or more electrodes of the set of electrodes are disposed between the first electrode and the second electrode, the plurality of electrode groups forming a row of pixels defined along a transmit electrode, the row of pixels having a length;

a value Y represents the number of electrodes in the set of receiving electrodes, a value N represents the number of electrodes in the first electrode group, a value Z is one greater than the number of electrodes disposed between the first and second electrodes, and $Y \leq 2NZ$; and performing steps (a) and (b) with respect to the first electrode group results in data being collected for two pixels spaced by at least one half of the length of the row of pixels.

Embodiment 13. The method of embodiment 12, wherein:
all of the electrodes of the set of electrodes are comprised within one or more of the plurality of electrode groups;
at least one electrode of at least one of each electrode group, other than the first electrode group, of the plurality of electrode groups is disposed between the first electrode and the second electrode.

Embodiment 14. The method of any of embodiments 12 and 13, wherein Z is less than or equal to 6, N is greater than or equal to 23, $Y \leq 1.1 \times NZ$, and performing steps (a) and (b) with respect to the first electrode group results in data being collected for two pixels spaced by at least ninety percent of the length of the row of pixels.

Embodiment 15. The method of any of embodiments 12-14, wherein the modulation pattern used for each electrode group is the same.

Embodiment 16. The method of any of embodiments 11-15, further comprising:
determining a segmentation mask based on the signals received from the plurality of electrode groups;
constructing a digital image based on the signals received from the plurality of electrode groups and the segmentation mask, wherein using the segmentation mask to construct the digital image removes from the digital image an image portion containing a periodic error pattern; and
determining a biometric parameter based on the digital image.

Embodiment 17. The method of any of embodiments 11-16, wherein the system further comprises at least a first differential receiver and a second differential receiver, the plurality of electrode groups comprises a second electrode group, the first differential receiver being arranged to receive signals from the electrodes of the first electrode group, and the second differential receiver being arranged to receive signals from the electrodes of the second electrode group, the method further comprising:
receiving, by the first differential receiver, signals from the electrodes of the first electrode group during a first time interval; and
receiving, by the second differential receiver, signals from the electrodes of the second electrode group during the first time interval and while the first differential receives signals from the electrodes of the first electrode group;
wherein the electrodes of first and second electrode groups together defining a superset, the superset of electrodes being interleaved with electrodes not within the superset such that for any pair of two electrodes selected from the superset, at least one electrode that is not within the superset is disposed between the selected pair.

Embodiment 18. The method of any of embodiments 11-17, further comprising:
deriving, from a modulation parameter stored in the memory, a plurality of vectors, the plurality of vectors together defining the modulation pattern.

Embodiment 19. The method of embodiment 18, further comprising deriving, from the modulation parameter, the demodulation pattern.

Embodiment 20. The method of any of embodiments 11-19, wherein the common restore value is approximately equal to a midpoint of a grayscale range used to construct a digital image based on the signals received from the plurality of electrode groups.

Embodiment 21. A system for detecting a user's finger or other elements, the system comprising:
a memory;
a sensor area, the sensor area being bounded by a frame, wherein the sensor area comprises a set of receiving electrodes, the set of receiving electrodes comprising all of the receiving electrodes of the sensor area, the set of receiving electrodes comprising a plurality of electrode groups, the plurality of electrode groups comprising at least a first electrode group and a second electrode group;
a processor, wherein the system is configured to:
process signals received by the electrode groups, wherein the step of processing the signals comprises, for each respective electrode group:
(a) modulating the signals received from each electrode of the respective electrode group according to a modulation pattern; and
(b) demodulating the signals, or values derived therefrom, received from each electrode of the respective electrode group according to a demodulation pattern, thereby determining a set of demodulated values for the respective electrode group;
wherein the first electrode group comprises a first electrode and a second electrode, the first electrode and the second electrode being arranged in the sensor area such that no electrode of the first electrode group is disposed between the first electrode and the second electrode;
the plurality of electrode groups are at least partially interleaved, such that one or more electrodes of the set of electrodes are disposed between the first electrode and the second electrode;
a value Y represents the number of electrodes in the set of receiving electrodes, a value N represents the number of electrodes in the first electrode group, a value Z is one greater than the number of electrodes disposed between the first and second electrodes, and $Y \leq 2NZ$.

Embodiment 22. The system of embodiment 21, further wherein:
substantially all of the electrodes of the set of electrodes are comprised within one or more of the plurality of electrode groups;
at least one electrode of at least one of each electrode group, other than the first electrode group, of the plurality of electrode groups is disposed between the first electrode and the second electrode.

Embodiment 23. The system of any of embodiments 21 and 22, wherein Z is less than or equal to 6 and N is greater than or equal to 23, and $Y \leq 1.1 \times NZ$.

Embodiment 24. The system of any of embodiments 21-23, wherein the modulation and demodulation patterns are selected such that steps (a) and (b) remove a mean value from the signals received by the electrodes of each respective electrode group; and
the system is further configured to add a global restore value to the demodulated values, the restore value being selected to compensate for the removed mean value, the restore value being the same for each electrode of the plurality of electrode groups.

Embodiment 25. The system of any of embodiments 21-23, wherein the modulation and demodulation patterns are selected such that steps (a) and (b) remove a mean value from the signals received by the electrodes of each respective electrode group; and
each of the electrode groups of the plurality of electrode groups shares a common electrode; and
the system is configured to add a respective restore value to the demodulated values for each electrode group, the respective restore value being the same for electrodes within a given group, the respective restore value for a given electrode group being based on at least one demodulated value obtained for a pixel defined by the common electrode.

Embodiment 26. The system of any of embodiments 21-25, wherein the system is further configured to:

determine a segmentation mask based on the signals received from the plurality of electrode groups;

construct a digital image based on the signals received from the plurality of electrode groups and the segmentation mask; and determine a biometric parameter based on the digital image, wherein use of the segmentation mask to construct the digital image facilitates the determination of the biometric parameter by removing from the digital image an image portion that would otherwise be characterized by an error pattern having a spatial period substantially equal to an average distance between adjacent receiving electrodes in the sensor area multiplied by Z.

Embodiment 27. The system of any of embodiments 21-26, wherein the system further comprises at least a first differential receiver and a second differential receiver, and the plurality of electrode groups comprises a second electrode group;

the first differential receiver being arranged to receive signals from the electrodes of the first electrode group;

the second differential receiver being arranged to receive signals from the electrodes of the second electrode group;

wherein the system is arranged such that during a first time interval, the first differential receiver receives signals from the electrodes of the first electrode group while the second differential receiver receives signals from the electrodes of the second electrode group; and the electrodes of first and second electrode groups together defining a superset, the superset of electrodes being interleaved with electrodes not within the superset such that for any pair of two electrodes selected from the superset, at least one electrode that is not within the superset is disposed between the selected pair.

Embodiment 28. The system of any of embodiments 21-27, wherein a modulation parameter is stored in the memory, the modulation pattern is a matrix and comprises a plurality of vectors arranged along a common dimension of the matrix, each vector of the plurality of vectors being derived from the modulation parameter.

Embodiment 29. The system of embodiment 28, wherein the demodulation pattern is derived from the modulation parameter.

Embodiment 30. The system of any of embodiments 21-29, wherein the modulation pattern used for each electrode group is the same.

Embodiment 31. A method for detecting a user's finger or other elements, the method being performed by a system comprising a memory, a processor, and a sensor area bounded by a frame, wherein the sensor area comprises a set of receiving electrodes, the set of receiving electrodes comprising all of the receiving electrodes of the sensor area, the set of receiving electrodes comprising a plurality of electrode groups, the plurality of electrode groups comprising at least a first electrode group and a second electrode group, the method comprising:

for each electrode group of the plurality of electrode groups:

(a) modulating the signals received from each electrode of the respective electrode group according to a modulation pattern; and (b) demodulating the signals, or values derived therefrom, received from each electrode of the respective electrode group according to a demodulation pattern, thereby determining a set of demodulated values for the respective electrode group;

wherein the first electrode group comprises a first electrode and a second electrode, the first electrode and the second electrode being arranged in the sensor area such that no electrode of the first electrode group is disposed between the first electrode and the second electrode;

the plurality of electrode groups are at least partially interleaved, such that one or more electrodes of the set of electrodes are disposed between the first electrode and the second electrode; and a value Y represents the number of electrodes in the set of receiving electrodes, a value N represents the number of electrodes in the first electrode group, a value Z is one greater than the number of electrodes disposed between the first and second electrodes, and $Y \leq 2NZ$.

Embodiment 32. The method of embodiment 31, further wherein:

all of the electrodes of the set of electrodes are comprised within one or more of the plurality of electrode groups;

at least one electrode of at least one of each electrode group, other than the first electrode group, of the plurality of electrode groups is disposed between the first electrode and the second electrode.

Embodiment 33. The method of any of embodiments 31 and 32, wherein Z is less than or equal to 6 and N is greater than or equal to 23, $Y \leq 1.1 \times NZ$, and performing steps (a) and (b) with respect to the first electrode group results in data being collected for two pixels spaced by at least ninety percent of the length of the row of pixels.

Embodiment 34. The method of any of embodiments 31-33, wherein the modulation and demodulation patterns are selected such that steps (a) and (b) remove a mean value from the signals received by the electrodes of each respective electrode group, the method further comprising:

adding a global restore value to the demodulated values, the restore value being selected to compensate for the removed mean value, the restore value being the same for each electrode of the plurality of electrode groups.

Embodiment 35. The method of any of embodiments 31-33, wherein the modulation and demodulation patterns are selected such that steps (a) and (b) remove a mean value from the signals received by the electrodes of each respective electrode group, and each of the electrode groups of the plurality of electrode groups shares a common electrode, the method further comprising:

adding a respective restore value to the demodulated values for each electrode group, the respective restore value being the same for electrodes within a given group, the respective restore value for a given electrode group being based on at least one demodulated value obtained for a pixel defined by the common electrode.

Embodiment 36. The method of any of embodiments 31-35, further comprising:

determining a segmentation mask based on the signals received from the plurality of electrode groups;

constructing a digital image based on the signals received from the plurality of electrode groups and the segmentation mask; and determining a biometric parameter based on the digital image, wherein use of the segmentation mask to construct the digital image facilitates the determination of the biometric parameter by removing from the digital image an image portion that would otherwise be characterized by an error pattern having a spatial period substantially equal to an average distance between adjacent receiving electrodes in the sensor area multiplied by Z.

Embodiment 37. The method of any of embodiments 31-36, wherein the system further comprises at least a first differential receiver and a second differential receiver, the plurality of electrode groups comprises a second electrode group, the first differential receiver is arranged to receive signals from the electrodes of the first electrode group, and the second differential receiver being arranged to receive signals from the electrodes of the second electrode group, the method further comprising:

receiving, by the first differential receiver, signals from the electrodes of the first electrode group during a first time interval; and receiving, by the second differential receiver, signals from the electrodes of the second electrode group during the first time interval and while the first differential receives signals from the electrodes of the first electrode group;

wherein the electrodes of first and second electrode groups together defining a superset, the superset of electrodes being interleaved with electrodes not within the superset such that for any pair of two electrodes selected from the superset, at least one electrode that is not within the superset is disposed between the selected pair.

Embodiment 18. The method of any of embodiments 31-37, further comprising: deriving, from a modulation parameter stored in the memory, a plurality of vectors, the plurality of vectors together defining the modulation pattern.

Embodiment 39. The method of embodiment 38, further comprising deriving, from the modulation parameter, the demodulation pattern.

Embodiment 40. The method of any of embodiments 31-39, wherein the modulation pattern used for each electrode group is the same.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A system for detecting a user's finger or other elements, the system comprising:
a memory;
a sensor area, wherein the sensor area comprises a set of receiving electrodes and a set of transmit electrodes, the set of receiving electrodes comprising all of the receiving electrodes of the sensor area, the set of receiving electrodes comprising a plurality of electrode groups, each electrode group comprising two or more receiving electrodes, the set of receiving electrodes defining a set of pixels comprising a first row of pixels defined along a first transmit electrode and a second row of pixels defined along a second transmit electrode, and wherein each row of pixels includes at least one pixel defined by at least one receiving electrode from each electrode group; and
a processor, wherein the system is configured to:

process signals received by the electrode groups, wherein the step of processing the signals comprises, for each respective electrode group:
 (a) modulating the signals received by each receiving electrode of the respective electrode group according to a modulation pattern; and
 (b) demodulating the signals, or values derived therefrom, received by each receiving electrode of the respective electrode group according to a demodulation pattern, thereby obtaining a demodulated value for a group of pixels defined by the receiving electrodes of the respective electrode group; and
repeat steps (a) and (b) for each transmit electrode to obtain a demodulated value for each pixel of the set of pixels;
wherein the modulation and demodulation patterns are selected such that steps (a) and (b) remove a mean value from the signals received by the receiving electrodes of each respective electrode group;
the system being further configured to add a global restore value to each of the demodulated values, the global restore value being selected to compensate for the removed mean value, and the global restore value being the same for each pixel of the set of pixels.

2. The system of claim 1, wherein the sensor area is bounded by a frame, and the plurality of electrode groups comprises a first electrode group comprising a first receiving electrode and a second receiving electrode, the first receiving electrode and the second receiving electrode being arranged in the sensor area such that no receiving electrode of the first electrode group is disposed between the first receiving electrode and the second receiving electrode;
wherein the plurality of electrode groups are at least partially interleaved, such that one or more receiving electrodes of the set of receiving electrodes are disposed between the first receiving electrode and the second receiving electrode;
wherein a value Y represents the number of receiving electrodes in the set of receiving electrodes, a value N represents the number of receiving electrodes in the first electrode group, a value Z is one greater than the number of receiving electrodes disposed between the first and second receiving electrodes, and $Y \leq 2NZ$.

3. The system of claim 2, wherein:
all of the receiving electrodes of the set of receiving electrodes are comprised within one or more of the plurality of electrode groups;
at least one receiving electrode of at least one of each electrode group of the plurality of electrode groups, other than the first electrode group, is disposed between the first receiving electrode and the second receiving electrode.

4. The system of claim 2, wherein Z is less than or equal to 6, N is greater than or equal to 23, and $Y \leq 1.1 \times NZ$.

5. The system of claim 1, wherein the modulation pattern used for each electrode group is the same.

6. The system of claim 1, wherein the system is further configured to:
determine a segmentation mask based on the signals received by the receiving electrodes of the plurality of electrode groups;
construct a digital image based on the signals received by the receiving electrodes of the plurality of electrode groups and the segmentation mask; and
determine a biometric parameter based on the digital image, wherein use of the segmentation mask to construct the digital image facilitates the determination of the biometric parameter by removing from the digital image an image portion that would otherwise be characterized by a periodic error pattern.

7. The system of claim 1, wherein the system further comprises at least a first differential receiver and a second differential receiver, and the plurality of electrode groups comprises a first electrode group and a second electrode group;
the first differential receiver being arranged to receive signals from the receiving electrodes of the first electrode group;
the second differential receiver being arranged to receive signals from the receiving electrodes of the second electrode group;
wherein the system is arranged such that during a first time interval, the first differential receiver receives signals from the receiving electrodes of the first electrode group while the second differential receiver receives signals from the receiving electrodes of the second electrode group; and
the receiving electrodes of first and second electrode groups together defining a superset of receiving electrodes, the superset of receiving electrodes being interleaved with receiving electrodes not within the superset such that for any pair of two receiving electrodes selected from the superset, at least one receiving electrode that is not within the superset is disposed between the selected pair.

8. The system of claim 1, wherein a modulation parameter is stored in the memory, and the modulation pattern is a matrix and comprises a plurality of vectors arranged along a common dimension of the matrix, each vector of the plurality of vectors being derived from the modulation parameter.

9. The system of claim 8, wherein the demodulation pattern is derived from the modulation parameter.

10. The system of claim 1, wherein the global restore value is approximately equal to a midpoint of a grayscale range used to construct a digital image based on the signals received by the receiving electrodes of the plurality of electrode groups.

11. A method for detecting a user's finger or other elements, the method being performed by a system comprising a memory, a processor, and a sensor area, wherein the sensor area comprises a set of receiving electrodes and a set of transmit electrodes, the set of receiving electrodes comprising all of the receiving electrodes of the sensor area, the set of receiving electrodes comprising a plurality of electrode groups, each electrode group comprising two or more receiving electrodes, the set of receiving electrodes defining a set of pixels comprising a first row of pixels defined along a first transmit electrode and a second row of pixels defined along a second transmit electrode, and wherein each row of pixels includes one receiving electrode from each electrode group, the method comprising:
for each respective electrode group in the plurality of electrode groups:
(a) modulating the signals received by each receiving electrode of the respective electrode group according to a modulation pattern; and
(b) demodulating the signals, or values derived therefrom, received by each receiving electrode of the respective electrode group according to a demodulation pattern, thereby obtaining a demodulated value for a group of pixels defined by the respective electrode group;
repeating steps (a) and (b) for each transmit electrode to obtain a demodulated value for each pixel of the set of pixels;
wherein the modulation and demodulation patterns are selected such that steps (a) and (b) remove a mean value from the signals received by the receiving electrodes of each respective electrode group; and
adding a global restore value to each of the demodulated values, the global restore value being selected to compensate for the removed mean value, and the global restore value being the same for each pixel of the set of pixels.

12. The method of claim 11, wherein the sensor area is bounded by a frame, and the plurality of electrode groups comprises a first electrode group comprising a first electrode and a second electrode, the first electrode and the second electrode being arranged in the sensor area such that no electrode of the first electrode group is disposed between the first electrode and the second electrode;
the plurality of electrode groups are at least partially interleaved, such that one or more receiving electrodes of the set of receiving electrodes are disposed between the first electrode and the second electrode, the first row of pixels having a length;
a value Y represents the number of receiving electrodes in the set of receiving electrodes, a value N represents the number of receiving electrodes in the first electrode group, a value Z is one greater than the number of receiving electrodes disposed between the first and second receiving electrodes, and Y≤2NZ; and
performing steps (a) and (b) with respect to the first electrode group results in data being collected for two pixels spaced by at least one half of the length of the first row of pixels.

13. The method of claim 12, wherein:
all of the receiving electrodes of the set of receiving electrodes are comprised within one or more of the plurality of electrode groups;
at least one receiving electrode of at least one of each electrode group of the plurality of electrode groups, other than the first electrode group, is disposed between the first receiving electrode and the second receiving electrode.

14. The method of claim 12, wherein Z is less than or equal to 6, N is greater than or equal to 23, Y≤1.1×NZ, and performing steps (a) and (b) with respect to the first electrode group results in data being collected for two pixels spaced by at least ninety percent of the length of the first row of pixels.

15. The method of claim 11, wherein the modulation pattern used for each electrode group is the same.

16. The method of claim 11, further comprising:
determining a segmentation mask based on the signals received by the receiving electrodes of the plurality of electrode groups;
constructing a digital image based on the signals received by the receiving electrodes of the plurality of electrode groups and the segmentation mask, wherein using the segmentation mask to construct the digital image removes from the digital image an image portion containing a periodic error pattern; and
determining a biometric parameter based on the digital image.

17. The method of claim 11, wherein the system further comprises at least a first differential receiver and a second differential receiver, the plurality of electrode groups comprises a first electrode group and a second electrode group, the first differential receiver being arranged to receive signals from the receiving electrodes of the first electrode group, and the second differential receiver being arranged to receive signals from the receiving electrodes of the second electrode group, the method further comprising;

receiving, by the first differential receiver, signals from the receiving electrodes of the first electrode group during a first time interval; and receiving, by the second differential receiver, signals from the receiving electrodes of the second electrode group during the first time interval and while the first differential receiver receives signals from the receiving electrodes of the first electrode group;

wherein the receiving electrodes of first and second electrode groups together define a superset of receiving electrodes, the superset of receiving electrodes being interleaved with receiving electrodes not within the superset such that for any pair of two receiving electrodes selected from the superset, at least one receiving electrode that is not within the superset is disposed between the selected pair.

18. The method of claim 11, further comprising:

deriving, from a modulation parameter stored in the memory, a plurality of vectors, the plurality of vectors together defining the modulation pattern.

19. The method of claim 18, further comprising deriving, from the modulation parameter, the demodulation pattern.

20. The method of claim 11, wherein the global restore value is approximately equal to a midpoint of a grayscale range used to construct a digital image based on the signals received by the receiving electrodes of the plurality of electrode groups.

* * * * *